United States Patent
Iguaro Jaramillo et al.

(10) Patent No.: US 12,288,368 B2
(45) Date of Patent: Apr. 29, 2025

(54) SYSTEMS AND METHODS FOR COMPRESSING VECTOR GRAPHICS

(71) Applicant: Canva Pty Ltd, Surry Hills (AU)

(72) Inventors: Henrry Eduardo Iguaro Jaramillo, Sydney (AU); Stephan Schwiebert, Sydney (AU); Velislava Yanchina, Byron Bay (AU)

(73) Assignee: Canva Pty Ltd, Surry Hills (AU)

( * ) Notice: Subject to any disclaimer, the term of this patent is extended or adjusted under 35 U.S.C. 154(b) by 138 days.

(21) Appl. No.: 18/211,239

(22) Filed: Jun. 17, 2023

(65) Prior Publication Data

US 2023/0419556 A1  Dec. 28, 2023

(30) Foreign Application Priority Data

Jun. 24, 2022 (AU) ................................ 2022204492

(51) Int. Cl.
*G06K 9/36* (2006.01)
*G06T 9/20* (2006.01)

(52) U.S. Cl.
CPC ...................................... *G06T 9/20* (2013.01)

(58) Field of Classification Search
CPC .. G06T 9/00; G06T 9/20; G06T 9/008; G06V 10/46; G06V 10/469; G06V 30/182; G06V 30/1823; H03M 7/3082; H04N 19/124; H04N 19/94
See application file for complete search history.

(56) References Cited

U.S. PATENT DOCUMENTS

| 8,213,732 B2 | 7/2012 | Axelsson | |
|---|---|---|---|
| 2003/0038738 A1* | 2/2003 | Oktem | H03M 7/30 341/87 |
| 2015/0227131 A1* | 8/2015 | Murakami | G05B 19/19 700/189 |

OTHER PUBLICATIONS

Anton Khlynovskiy, 'Of SVG, Minification and Gzip', Nov. 15, 2017, pp. 1-14 [retrieved on Jul. 6, 2023].
Battiato, S., Greco, F., & Nicotra, S. (2006, February), Compressed SVG Representation of Raster Images Vectorized by DDT Triangulation. In Eurographics Italian Chapter Conference (pp. 233-239).
C. Seel-audom, W. Naiyapo and V. Chouvatut, "A search for geometric-shape objects in a vector image: Scalable Vector Graphics (SVG) file format," 2017 9th International Conference on Knowledge and Smart Technology (KST), Chonburi, Thailand, 2017, pp. 305-310, doi: 10.1109/KST.2017.7886098.

(Continued)

*Primary Examiner* — Duy M Dang
(74) *Attorney, Agent, or Firm* — GrowIP Law Group LLC

(57) ABSTRACT

Described herein is a computer implemented method for compressing a shape. The method includes: receiving input shape data defining first and second original shape commands and generating first and second compressed shape commands corresponding thereto. Generating the second compressed shape command includes generating a relative shape command that is a version of the second original shape command in which parameters are relatively defined; generating an absolute shape command that is a version of the second original shape command in which parameters are absolutely defined; and selecting a smaller or equal smallest of the relative shape command and the absolute shape command to be the second compressed shape command.

20 Claims, 11 Drawing Sheets

(56) References Cited

OTHER PUBLICATIONS

Examination Report No. 1 for Australian Patent Application No. 2022204492 mailed Jul. 13, 2023 (pp. 1-7).
Examination Report No. 1 for Australian Patent Application No. 2022206819 mailed Jul. 13, 2023 (pp. 1-8).
G. Harit, R. Garg and S. Chaudhury, "An Integrated Scheme for Compression and Interactive Access to Document Images," 2007 International Conference on Computing: Theory and Applications (ICCTA'07), Kolkata, India, 2007, pp. 506-511, doi: 10.1109/ICCTA.2007.29.
Mariana Beldi, Sep. 3, 2020, 'How to Simplify SVG Code Using Basic Shapes', pp. 1-11 [retrieved on Jul. 6, 2023].
Probets S, Mong J, Evans D, Brailsford D, "Vector graphics: from PostScript and Flash to SVG", InProceedings of the 2001 ACM Symposium on Document engineering 2001 Nov. 9 (pp. 135-143).
Steven Bradley, 'SVG Basics—Creating Paths With Line Commands', Jan. 26, 2015, pp. 1-11 [retrieved on Jul. 6, 2023].

\* cited by examiner

SYSTEMS AND METHODS FOR COMPRESSING VECTOR GRAPHICS

CROSS-REFERENCE TO RELATED APPLICATION

This application is a U.S. Non-Provisional Application that claims priority to Australian Patent Application No. 2022204492, filed Jun. 24, 2022, which is hereby incorporated by reference in its entirety.

TECHNICAL FIELD

Aspects of the present disclosure are directed to systems and methods for compressing vector graphics.

BACKGROUND

Many computer applications make use of vector graphic format images to store and display digital images.

As with all digital images, vector graphics have to be stored in memory. Accordingly, there are significant advantages to be had if a vector graphic can be compressed so that, inter alia, less memory is required to store that vector graphic.

SUMMARY

Described herein is a computer implemented method for generating a compressed shape, the method including: receiving input shape data defining a plurality of shape commands, the plurality of shape commands including an first original shape command and an second original shape command; generating a first compressed shape command, the first compressed shape command corresponding to the first original shape command; adding the first compressed shape command to the compressed shape; generating a second compressed shape command, the second compressed shape command corresponding to the second original shape command; and adding the second compressed shape command to the compressed shape, wherein generating the second compressed shape command includes: generating a relative version of the second shape command in which one or more parameters defined by the second original shape command are relatively defined; generating an absolute version of the second shape command in which one or more parameters defined by the second original shape command are absolutely defined; and selecting a smaller or equal smallest of the relative version and the absolute version to be the second compressed shape command.

Also described herein is a computer implemented method for compressing a shape, the method including: receiving input shape data defining one or more shape commands; processing a first shape command of the one or more shape commands by: determining a type of the first shape command; in response to determining the type of the first shape command is a line type shape command: determining if the first shape command defines a negligible line; and in response to determining that the first shape command does not define a negligible line, recording the first shape command by adding data from the first shape command to a compressed shape.

Figure 1:
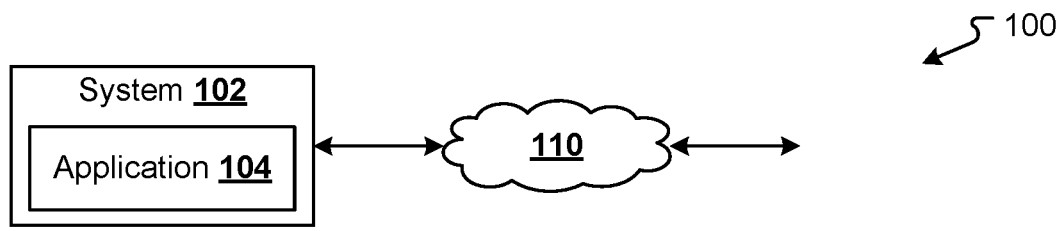
FIG. 1 depicts a computer processing system that is configured to perform the various functions described herein.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is directed to systems and methods for compressing vector graphic format images.

The present disclosure provides two approaches to compressing a vector graphic format image (referred to as a vector graphic). These are referred to as a simplification process and a minification process respectively. A vector graphic may be processed in accordance with both the simplification and minification processes. Alternatively, a vector graphic may be processed only in accordance with the simplification process or only in accordance with the minification process: i.e. the simplification process can be used without the minification processes and vice versa.

Both the simplification and minification approaches described herein are lossy approaches to vector graphic compression. Accordingly, while processing a vector graphic in accordance with one or both of these processes may serve to provide a smaller (in byte/data size) version of that vector graphic, some detail of the original vector graphic may be lost in doing so.

The simplification and the minification approaches described herein are computer implemented approaches. With this in mind, FIG. 1 depicts a computer processing system 102 that is configured to perform the various functions described herein. Computer processing system 102 may be any suitable type of computer processing system, for example a desktop computer, a laptop computer, a tablet device, a smart phone device, or an alternative computer processing system.

In this example, computer system 102 is configured to perform the functions described herein by execution of a software application 104—that is, instructions that are stored in a storage device (such as non-transitory memory 210 described below) that is accessible to the computer system 102 and that are executed by a processing unit of the system 102 (such as processing unit 202 described below).

Application 104 may take various forms, For example, application 104 be a native/stand-alone application that is used to compress vector graphics. Alternatively, application 104 may be part of a larger application (e.g. an add-on or plug-in)—or configured to operate with a larger application—that provides functions that make use of vector graphics—for example, a design application that allows users to create/edit/save/share designs, an image processing application that allows users to create/view/save/share digital images, or an alternative application. Application 104 may be a native application or a web browser application (such as Chrome, Internet Explorer, Safari or an alternative web browser application).

In the present disclosure, application 104 is described as configuring system 102 to perform two compression processes. These will be referred to as a simplification process (e.g. process 300) and a minification process (e.g. process 400). Application 104 may, however, configure system 102 to perform only one of these processes. In this case, the other process may not be performed at all, or a separate application (not shown) may configure system 102 (or an alternative computer processing system) to perform the other process.

Further, while application 104 is depicted as running on a single computer processing system 102, it may be a distributed application in which the functionality is performed by multiple inter-operating applications that may execute on the same or different computer processing systems. As one example, application 104 may be a client application that communicates (via network 110) with a server application (not shown), and the functionality described herein is jointly performed by the client and server applications.

In the example of FIG. 1, system 102 is connected to a communications network 110. Via network 110 system 102 can communicate with (e.g. send data to and receive data from) other computer processing systems (not shown). The techniques described herein can, however, be implemented on a stand-alone computer system that does not require network connectivity or communication with other systems.

In FIG. 1, system 102 is depicted as having/executing a single application 104. However, system 102 may (and typically will) include additional applications (not shown). For example, and assuming application 104 is not part of an operating system application, system 102 will include separate operating system application (or group of applications).

Figure 2:
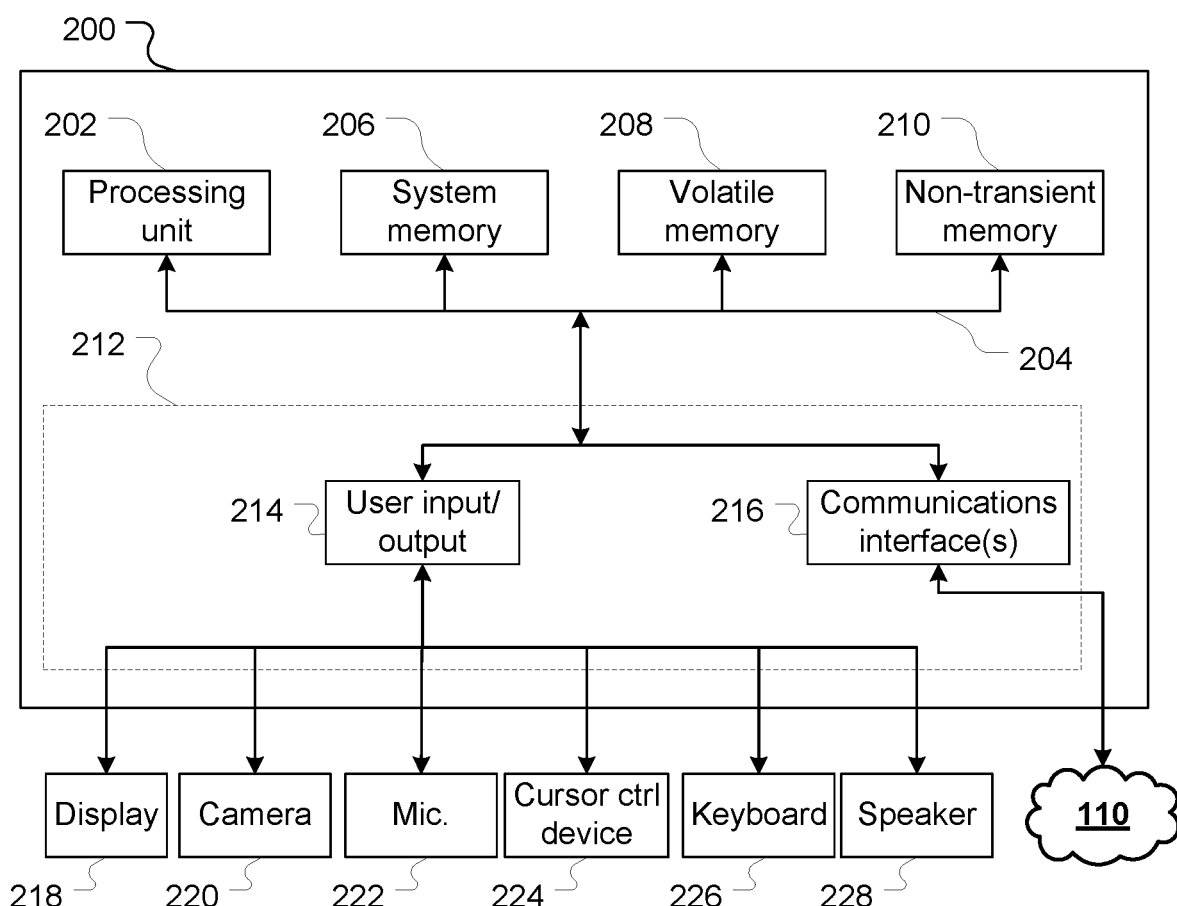
FIG. 2 is a block diagram depicting hardware components of a computer processing system.

Turning to FIG. 2, a block diagram depicting hardware components of a computer processing system 200 is provided. The computer processing system 100 of FIG. 1 may be a computer processing system such as 200 (though alternative hardware architectures are possible).

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage devices (also referred to as memory devices). Computer readable instructions and/or data which are executed by the processing unit 202 to control operation of the processing system 200 are stored on one more such storage devices. In this example system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 200 connects—whether by wired or wireless means—include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse (or other cursor control device), trackpad, microphone, accelerometer, proximity sensor, GPS, and/or other input devices. System 200 may also include or connect to one or more output devices controlled by system 200 to output information. Such output devices may include devices such as a display (e.g. a LCD, LED, touch screen, or other display device), speaker, vibration module, LEDs/other lights, and/or other output devices. System 200 may also include or connect to devices which may act as both input and output devices, for example memory devices (hard drives, solid state drives, disk drives, and/or other memory devices) which system 200 can read data from and/or write data to, and touch screen displays which can both display (output) data and receive touch signals (input).

By way of example, where system 200 is a personal computing device such as a desktop or laptop device, it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

As another example, where system 200 is a portable personal computing device such as a smart phone or tablet it may include a touchscreen display 218, a camera a camera device 220, a microphone device 222, and a speaker device 228.

As another example, where system 200 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 200 also includes one or more communications interfaces 216 for communication with a network, such as network 110 of FIG. 1. Via the communications interface(s) 216, system 200 can communicate data to and receive data from networked systems and/or devices.

System 200 may be any suitable computer processing system, for example, a server computer system, a desktop computer, a laptop computer, a tablet computing device, a smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, in FIG. 1 computer processing system 100 (which may be or include the hardware components of computer processing system 200) includes and executes application 104.

In some cases part or all of a given computer-implemented method will be performed by system 200 itself, while in other cases processing may be performed by other devices in data communication with system 200.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

As noted, the present disclosure is concerned with vector graphics. The following provides a brief overview of some relevant vector graphic features and an overview of certain terminology used in this disclosure.

The techniques described herein are described with specific reference to the Scalable Vector Graphic (SVG) Version 2 format. Information on feature and syntax of the SVG Version 2 format can be found in the "Scalable Vector Graphics (SVG) 2: W3C Candidate Recommendation 4 Oct. 2018" specification made available by the World Wide Web Consortium (W3C).

While the examples provided herein are with reference to the SVG Version 2 format, it will be appreciated that these techniques may be able to be adapted to be used other vector graphic formats (including previous and subsequent SVG version and other, non SVG vector graphic formats).

By way of more specific example, the simplification process described herein may be used (or be adapted to be used) to simplify other drawing formats such as PDF (e.g. by simplifying shapes before serialisation). The minimisation process described may be used with any vector graphic format that provides a distinction between (and the ability to define shapes in terms of) absolute and relative coordinates.

In the present disclosure, and unless context indicates otherwise, reference to a shape is reference to a vector graphic shape.

A vector graphic shape is defined by shape data. The shape data includes an ordered set of one or more shape commands. Each shape command includes a command identifier (which may be explicit or implicit) and one or more parameters (each parameter a numeric value that defines an x or y coordinate). For example, and in the SVG context, the shape data

"M 0 0 L 5 10 20 20"

Includes three shape commands:
Shape command 1: "M 0 0" (move to position (0,0));
Shape command 2: "L 5 10" (draw a straight line from current position (which is (0,0) to position (5,10));
Shape command 3: "L 20 20" (draw a straight line from current position (which is (5,10) to position (20,20)).

In this example, the command identifier of the second shape command ('L') is explicit in the shape data, while the command identifier of the third shape command ('L') is implicit. This makes use of the SVG syntax feature that allows a command identifier to be omitted if it is identical to the previous explicit command identifier.

A shape command may define absolute parameters (which provide absolute positions, for example on a Cartesian plane on which the shape is to be drawn/rendered) or relative parameters (which provide parameters that are relative to the previous shape command in the shape data). For example, in the SVG context capital letter command identifiers indicate absolute parameters and lower case command identifiers indicate relative parameters. Accordingly, the shape command "L 5 5" indicates a straight line is to be drawn from a starting point (discussed further below) to the position x=5 y=5 on the Cartesian plane the shape is being drawn/rendered on. Conversely, the shape command "l5 5" indicates a straight line is to be drawn from a starting point to a position that is (x=starting point x+5, y=starting point y+5). In the present disclosure, reference to an absolute shape command is reference to a shape command that defines absolute parameters (coordinates) and reference to a relative shape command is reference to a shape command that defines relative parameters (coordinates).

Each shape command can be considered as having a start point and a target (or end) point.

In the SVG context, start points are not explicitly defined. Instead, the start point of a given shape command is the end/target point of the immediately preceding shape command. An example of this is above, where the start point of the second shape command (0,0) is the end/target point of the first shape command.

In the SVG context, example target points defined by selected SVG command types are as follows:

| Command Type | Example commands | Target x coord. | Target y coord. |
|---|---|---|---|
| moveto | "M $x_t\,y_t$" or "m $x_t\,y_t$" | $x_t$ | $y_t$ |
| closepath | "Z" or "z" | See below | See below |
| line | "L $x_t\,y_t$" or "l $x_t\,y_t$" | $x_t$ | $y_t$ |
| line | "H $x_t$" or "h $x_t$" | $x_t$ | See below |
| line | "V $y_t$" or "v $y_t$" | See below | $y_t$ |
| cubic | "C $x_1\,y_1\,x_2\,y_2\,x_t\,y_t$" or "c $x_1\,y_1\,x_2\,y_2\,x_t\,y_t$" | $x_t$ | $y_t$ |
| Cubic | "S $x_2\,y_2\,x_t\,y_t$" or "s $x_2\,y_2\,x_t\,y_t$" | $x_t$ | $y_t$ |
| Quadratic | "Q $x_1\,y_1\,x_t\,y_t$" or "q $x_1\,y_1\,x_t\,y_t$" | $x_t$ | $y_t$ |
| Quadratic | "T $x_t\,y_t$" or "t $x_t\,y_t$" | $x_t$ | $y_t$ |

As can be seen, the 'closepath' command type does not explicitly define any target coordinates. The target point for a closepath shape command is the target of the last moveto shape command that was encountered in the shape data.

As can also be seen, a horizontal line shape command only defines an x coordinate for its target point. The y coordinate of a horizontal line shape command will be the last target y coordinate defined in the shape data. Similarly, a vertical line shape command only defines a y coordinate for its target point. The x coordinate of a vertical line shape command will be the last target x coordinate defined in the shape data.

In addition to target points, cubic and quadratic curve shape commands may also describe one or more control points (each control point defined by a pair of parameters that define an (x,y) position of the control point). For example, and as can be seen in the table above, the SVG format provides for: a cubic Bezier curve ('C', 'c') which defines two control points; a smooth cubic Bezier ('S', 's') which defines one control point; and a quadratic Bezier curve ('Q', 'q') which defines one control point. The SVG format also provides for a smooth quadratic Bezier ('T', 't') which does not define any control points.

As another example, the techniques described herein may be performed (or be adapted to be performed) on a Shape object as defined by the Java Graphics API. The Java Graphics API provides has Shape operations that are similar to those described by the SVG specification—e.g.:

Move To (x,y)
Line to (x, y)
Quadratic Curve To (cpx, cpy, x, y)
Cubic Curve To (cpx1, cpy1, cpx2, cpy2, x, y)
Close Path Turning to FIG. 3, a first vector graphic compression process 300 will be described. This will be referred to as a simplification process. Generally speaking, simplification process 300 is a lossy compression process that takes vector graphic shape data as input and returns a simplified (e.g. compressed) version of the shape defined by the input shape data.

Over the course of process 300, application 104 makes use of a Simplified Shape variable (e.g. a string), a Last Move variable, and a Current Position variable. The Last Move and Current Position variables may, for example, each include a pair of double precision floating point numbers, one representing an x coordinate and the other a y coordinate.

The Simplified Shape variable is populated with shape commands over the course of the simplification process and eventually returned by process 300. The Simplified Shape variable may also be referred to as a Compressed Shape variable, in that its data defines a compressed version of the input shape. Furthermore, each shape command that is added to the Simplified Shape over the course of process 300 corresponds to one or more input shape commands (i.e. a shape command of the original shape being processed). A shape command added to the Simplified Shape (or Compressed Shape) variable may, therefore, be referred to as a compressed version of its corresponding input shape(s).

The Last Move variable stores the x and y coordinates of the last move type command that was processed. The x and y coordinates stored by the Last Move variable are expressed as absolute coordinates.

The Current Position variable is used to store a current position (e.g. (x,y) coordinate pair). Typically, the current position will be defined by the end (or target) point of the last shape command that was is added to the simplified shape that is generated over the course of process 300. The x and y coordinates stored by the Current Position variable are expressed as absolute coordinates.

In alternative implementations, instead of maintaining a Last Move and/or a Current Position variable over the course of process 300, application may instead be configured to determine the Last Move coordinates and/or Current Position coordinates by inspecting the Simplified Shape variable. In this case, the Current Position will be the target coordinates (parameters) of the last shape command that was added to the Simplified Shape variable (converted to absolute coordinates if necessary) and the Last Move will be the target coordinates (parameters) of the last "Move to" shape command that was added to the Simplified Shape variable (converted to absolute coordinates if necessary).

If application 104 determines the Current Position (and/or Last Move) coordinates based on the state of the Simplified Shape, and the last shape command added to the Simplified Shape was relatively expressed, application 104 will need to calculate absolute coordinates for the Current Position (and/or Last Move). This involves taking into account one or more previous shape commands that have been added to the Simplified Shape. Specifically, application 104 may need to inspect the Simplified Shape to identify the most recently added absolutely expressed shape command and then calculate the current position based on the target defined by that command plus the target(s) of any later added relatively expressed shape commands.

To illustrate this, consider a Simplified Shape string of:
"M 0 0 L 5 5 l 20 155 l 10 10"
In this example, the last shape command added to the Simplified Shape ("l 10 10") has relatively expressed parameters (as indicated by the lower case 'l' command identifier). Accordingly, the target of that last shape command (10, 10) does not define the current position in absolute terms. To determine the current position in absolute terms, application 104 identifies the last recorded absolute shape command (in this case "L 5 5") and calculates the current position in absolute coordinates by adding the target coordinates of the relative shape commands that were added to the Simplified Shape after the last absolute shape command (the "L 5 5" shape command) to the target coordinates of the last absolute shape command. E.g.:

Current x position(absolute)=5+20+10=35

Current y position(absolute)=5+15+10=30

Over the course of process 300, application may also make use of an Open Line variable (e.g. a string). Application 104 uses the Open Line variable to determine whether two or more input straight line shape commands can be combined into a single straight line shape command and, if so, to build that single straight line shape command before adding it to the Simplified Shape being created.

At 302, application 104 receives input shape data in in respect of an input shape. The input data defines one or more shape commands, each shape command including a command identifier and one or more command parameters.

By way of example, and in the SVG context, the input shape data may be (or include) the following:

<path d="M 0 0 L 5 5 10 20 30 30 H 20 V 20" stroke="black"/>

In this case, the one or more shape commands are defined by the string "M 0 0 L 5 5 10 20 30 30 H 20 V 20".

As another example, the input shape data may be a Shape object as defined by the Java Graphics API—which also includes one or more shape commands. E.g. the above SVG string could be expressed as the following Java shape commands:

Move To (0, 0)
Line To (5, 5)
Line To (10, 20)
Line To (30, 30)
Line To (20, 30)
Line To (20, 20)

At 304, application 104 extracts (or generates) an ordered list of individual shape commands from the input shape data (the order of the commands matching their order in the input data).

In the SVG context, a command identifier may be omitted if it is identical to the immediately preceding command identifier. The example shape data above provides an example of this, in the "L 5 5 10 20 30 30" portion of the string. This portion can be rewritten as "L 5 5 L 10 20 L 30 30", the second and third lineto commands (with command identifier 'L') being implicitly defined in the input data.

In the present example, when generating the list of shape commands at 304, application 104 explicitly adds any implicitly defined command identifiers to individual shape commands. To continue the above example, for the input shape data of "M 0 0 L 5 5 10 20 30 30 H 20 V 20" application 104 would generate the following list of shape commands:

"M 0 0" (having command identifier 'M' and parameters '0' and '0');
"L 5 5" (having command identifier 'L' and parameters '5' and '5');
"L 10 20" (having command identifier 'L' and parameters '10' and '20');
"L 30 30" (having command identifier 'L' and parameters '30' and '30');
"H 20" (having command identifier 'H' and parameter '20'); and
"V 20" (having command identifier 'V' and parameter '20').

At 308, application 104 determines whether the input shape data defines what will be referred to as a simple shape. The purpose of this determination is to avoid the processing involved in simplifying a shape that is already relatively 'simple'.

Application 104 may be configured to determine whether the shape is simple in various ways. In the present embodiment, application 104 determines whether a shape is simple by comparing the number of shape commands defined by the shape (as extracted at 304) with a defined commands threshold (and if the number of shape commands defined by the shape is less than the commands threshold, determine the input shape to be a simple shape). Any appropriate commands threshold may be defined—e.g. a threshold of 500. Alternative measures of simplicity may be used. For example, application 104 may instead count the number of parameters defined by the shape data and compare this to a parameter threshold (input parameters <=parameter threshold=simple shape).

If, at 308, application 104 determines that the input shape is a simple shape, processing proceeds to 310. In this case the shape simplification process ends without further processing. In the present embodiment, application 104 returns the input shape data at 310. In alternative embodiments, application 104 may instead return data indicating that the input shape will not be simplified.

If, at 308, application 104 determines that the input shape is not a simple shape, processing proceeds to 312. At 312, application 104 initialises the Simplified Shape variable (as discussed above).

The manner in which the Simplified Shape is initialised will depend on the format to be used. For example, the Simplified Shape may be initialised as an empty string. Alternatively, the Simplified Shape may be initialised to include relevant syntax data as required by the vector graphic format in question.

By way of example, in the SVG context, the Simplified Shape may be an SVG document fragment, in which case application 104 may initialise the Simplified Shape by creating a string and populating it with relevant SVG syntax data—e.g.:

```
"<svg width="width" height="height" version="1.1">
  <path d = "
"
Or
  "<path d = "
"
Or simply:
  ""(an empty string)
```

If additional data (e.g. to comply with the relevant vector graphic format syntax) is required to that included in the Simplified Shape on initialisation this data can be added at any appropriate point—either by application 104 or by an alternative application (e.g. an application calling method 300). Such additional data may be taken from (or based on) the input shape data.

In the present embodiments, application 104 performs a parameter shortening process to reduce the sizes of the shape command parameters. Generally speaking, this involves reducing the number of decimal places of the parameters values to a maximum number of decimal places. This reduces the size (in bytes) of the shape commands defining a shape and, accordingly, the memory required to store that shape and the computational resources required to process that shape. While dropping decimal places may lead to visual artefacts or glitches, this is expected in a lossy compression scheme. As a result, lossy compression schemes such as those described herein are used when the possibility of visual artefacts is outweighed by the advantages that are provided (e.g. the reduced byte-size and storage needed to store the graphic).

Generally speaking, application 104 performs the parameter shortening process by determining a maximum number of decimal places (at 314) and then shortening the parameter values of each shape command to that maximum number of decimal places (at 322).

In the present embodiment, application 104 is configured to determine the maximum number of decimal places at 314 based on the size (in a number of bytes sense) of the input shape data and, in particular, based on the number of shape commands (as determined at 304). Specifically, application 104 is configured to determine different maximum decimal place numbers for different ranges of shape command numbers. For example: for a first range of shape commands, application 104 determines a first maximum number of decimal places; for a second range of shape commands, application 104 determines a second maximum number of decimal places; for a third range of shape commands, application 104 determines a third maximum number of decimal places; and so forth.

By way of more specific example, application 104 may be configured so that: if the number of shape commands is greater than or equal to 500 (which, in this case, is the threshold for determining whether an input shape is simple at 308) and less than 5,000 (e.g. a first range), the maximum number of decimal places is 3; if the number of shape commands is greater than or equal to 5000 but less than 20,000 (e.g. a second range) the maximum number of decimal places is 2; if the number of shape commands is greater than or equal to 20,000 but less than 50,000 (e.g. a third range) the maximum number of decimal places is 1; if the number of shape commands is greater than or equal to 50,000 (e.g. a fourth range), the maximum number of decimal places is 0 (i.e. all parameter values will end being shortened to integer values). Additional or alternative ranges may be used, and ranges may be associated with alternative maximum numbers of decimal places. As can be seen from this example, as the number of shape commands (and therefore the byte size of the shape) increases the maximum number of decimal places decreases.

In the present embodiment application 104 actually shortens the parameter values at 322 (discussed below). This shortening could, however be performed immediately following determination of the maximum number of decimal places (or an alternative point in in process 300).

In alternative embodiments, application 104 may be configured to determine the maximum number of decimal places based one or more of: a number of parameters defined by the input shape data; a number of shape commands defined by the input data; a number of segments defined by the input shape data.

In further alternative embodiments, application 104 may be configured to use a single (constant) maximum number of decimal places, regardless of how many shape segments are defined. For example, application 104 may be configured to round all parameter values to a maximum of 1 decimal place (or 2 decimal places or an alternative maximum) regardless of how many shape segments are defined. If a constant maximum number of decimal places is used operation 314 is omitted.

In still further alternative embodiments, application may be configured to forego the parameter shortening process altogether (and omit operations 314 and 322).

Following 314, application 104 processes each shape command in the list of shape commands extracted at 304.

Any appropriate processing loop may be used to process the shape commands, the loop generally involving selecting the shape commands from the list generated at 306 in order and processing each shape command according to the described operations.

At 316, therefore, application 104 determines if there are any unprocessed shape commands in the list of shape commands generated at 304. If all shape commands have been processed, processing proceeds to 318. Otherwise, processing proceeds to 320.

At 318, all shape commands for the current shape have been processed. In this case application 104 returns the Simplified Shape (as initialised at 312 and updated over the course of process 300).

If any additional data needs to be added to the Simplified Shape (e.g. to comply with the requirements of the vector graphic format in question), such data can be added to the Simplified Shape by application 104 before returning it, or can be added by another application or process after the Simplified Shape has been returned. Where additional data is required some or all of it may be taken from (or based upon) corresponding data from the input shape.

Once generated, the Simplified Shape can be used (or further adapted to be used) in various ways. For example it can be saved as a standalone vector graphic, rendered on a display, converted into an alternative image format (e.g. a raster image format), shared (by communication over a network or other means), published (e.g. on a website or the like), and/or incorporated into a larger vector graphic or design (that can in turn be saved, rendered, converted, shared, published, or otherwise used). Furthermore, the Simplified Shape may be passed to a minification process such as process 400 described below.

At 320, there are unprocessed shape commands. Accordingly, application 104 selects the next unprocessed shape command from the list of shape commands generated at 304 for processing. The shape command selected at 320 will be referred to as the selected shape command. The shape command selected at 320 may also be referred to as a first shape command (noting that first here is used as a label rather than in an ordinal sense, and there may well be previous shape commands processed in previous processing loops of process 300).

At 322, application 104 shortens the parameter(s) of the selected shape command. To do so, application 104 shortens any parameter that originally uses more than the maximum number of decimal places (e.g. as determined at 314) so it only uses the maximum number of decimal places. Application 104 may shorten a parameter in various ways, for example by performing a rounding or truncation operation.

At 324, application 104 determines a type of the selected shape command, in this example based on its command identifier. By way of example, the shape command type may be: a move type shape command (e.g. with command identifier 'M' or 'm' in the SVG context or "Move To" in the Java context), in which case processing proceeds to 330; a straight line type shape command (e.g. with command identifier 'L', 'l', 'H', 'h', 'V', or 'v' in the SVG context or "Line To" in the Java context), in which case processing proceeds to 340; a curved line type shape command—e.g. a quadratic Bezier command (with command identifier 'Q', 'q', 'T', or 't' in the SVG context or "Quadratic Curve To" in the Java context) or a cubic Bezier command (with command identifier 'C', 'c', 'S', or 's' in the SVG context or "Cubic Curve To" in the Java context), in which case processing proceeds to 360; a close path type shape command (e.g. with command identifier 'Z' or 'z' in the SVG context or "Close Path" in the Java context), in which case processing proceeds to 390.

If, at 324, an unsupported command type is encountered, processing proceeds to 326. Application 104 may handle unsupported command types in various ways. In the present example, where an unsupported command type is encountered application 104 generates and returns an error.

In certain cases, application 104 may not support simplification of a particular command type, but may nonetheless be configured to recognise the command type and, in particular, the parameter(s) of that command type that define the end or target point. In this case, application 104 may handle the shape command by adding it to the Simplified Shape and updating the Current Position variable based on the known end point. For example, and in the SVG context, application 104 may not be configured to handle elliptical arc commands ('A' or 'a'), but may nonetheless be configured to recognise that the end/target point of an elliptical arc command are the final two parameters (which define an x and a y coordinate respectively). In this case, when an elliptical arc command is encountered at 324 application 104 may write that command to the Simplified Shape as is and update the x and y coordinates of the Current Position variable to be the end/target point defined by that command.

At 330, the selected shape command is a move type shape command.

At 330, application 104 determines if an Open Line variable (referred to as an Open Line for ease of reference) exists. An Open Line will exist if it has been initialised (e.g. at 350) and has not been deleted or otherwise closed (e.g. at 332, 348, 376). If, at 330, an Open Line exists, processing proceeds to 332. Otherwise, processing proceeds directly to 334.

At 332, application 104 adds the Open Line to the Simplified Shape being generated. To do so, application 104 appends the data in the Open Line to the Simplified Shape. Application 104 then deletes (or otherwise closes) the Open Line variable. Processing then proceeds to 334. The data in the Open Line shape will define a shape command that corresponds to (and is a compressed version of) one or more of the shape commands of the input shape.

At 334, application 104 records the selected shape command. In this case, application 104 records the selected shape command by adding (e.g. appending) the selected shape command to the Simplified Shape. The shape command appended to the Simplified Shape may be referred to as the compressed version of the selected shape command.

At 336, application 104 updates the Last Move variable to record the end or target point defined by the selected (move type) shape command.

At 338, application 104 updates the Current Position variable based on the end/target point defined by the selected shape command. Specifically, application 104 records the (x,y) end/target point defined by the selected move type shape command as the (x,y) values of the Current Position variable.

Processing then returns to 316.

At 340, the selected shape command is a straight line type shape command.

At 340, application 104 determines whether the selected shape command defines what will be referred to as a negligible line. Application 104 may determine whether the selected shape command defines a negligible line in various ways.

In the present embodiment, application 104 determines whether the selected shape command defines a negligible line based on the proximity of the end or target point of the line defined by the selected shape command to a start point of the line defined by the selected shape command. In the present example, the start point of the line defined by the selected shape command will be the x and y coordinates of the Current Position variable.

Application 104 may be configured to determine whether the selected shape command defines a negligible line in various ways.

For example, application 104 may be configured to determine whether the selected shape command defines a negligible line by calculating the Euclidean distance between the start and end points of the line defined by the selected shape command and determining whether the distance is less than a defined proximity threshold. In the context of a Cartesian coordinate system, the Euclidean distance between a start points $(x_1,y_1)$ and an end point $(x_2,y_2)$ can be calculated according to the formula (Square root$((x_2-x_1)^2+(y_2-y_1)^2)$). If the Euclidean distance is less than the defined proximity threshold, application determines that the shape command defines a negligible line. Conversely, if the Euclidean distance is greater than or equal to the defined proximity threshold, application 104 determines that the shape command does not define a negligible line.

In this case, the defined proximity threshold is generally set so that short lines that would be imperceptible (or largely imperceptible) to a viewer at a normal magnification are ignored. To this end, application 104 may be configured with any appropriate defined proximity threshold. By way of example, the defined proximity threshold in this example may be: 0.1 if the maximum number of decimals determined at 314 is greater than or equal to 1; 1 if the maximum number of decimals determined at 314 is less than 1 (i.e. 0). Alternatively, application 104 may be configured to use a same (constant) proximity threshold regardless of the maximum number of decimals determined at 314—e.g. 1 (or 0.1, or any other appropriate threshold). In alternative implementations, application 104 may be configured to dynamically determine the proximity threshold based on a size of the input graphic. To illustrate this, application 104 could, for example, be configured to determine the longest (or equal longest) side length of the input shape and set the proximity threshold proportionately—e.g. to $\frac{1}{100}^{th}$ of the longest side length (or an alternative fraction of the longest side length).

By way of alternative example, application 104 may be configured to determine whether the selected shape command defines a negligible line by calculating a horizontal distance between the x coordinates of the start and end points of the line defined by the selected shape command (e.g. horizontal distance=|start x−end x|) and calculating a vertical distance between the y coordinates of the start and end points of the line defined by the selected shape command (e.g. vertical distance=|start y−end y|). If the horizontal distance is less than a defined horizontal proximity threshold and the vertical distance is less than a defined vertical proximity threshold, application determines that the shape command defines a negligible line. Conversely, if the horizontal distance is greater than or equal to the defined horizontal proximity threshold or the vertical distance is greater than or equal to the defined vertical proximity threshold, application 104 determines that the shape command does not define a negligible line. In this case, the defined horizontal and vertical proximity thresholds will typically be the same, however they could be different. As per the proximity threshold described above, the defined horizontal and vertical proximity thresholds are generally set so that short lines that would be imperceptible (or largely imperceptible) to a view of the shape at a normal magnification (e.g. 100%) are ignored, and/or could be dynamically determined by the application based on the size of the input shape.

The proximity threshold(s) used when determining whether a line defined by a straight line shape command is negligible may be referred to as straight line proximity threshold(s) (as opposed to curved line proximity thresholds as discussed below).

If, at 340, application 104 determines that the selected shape command defines a negligible line, application 104 ignores the selected shape command and processing returns to 316. In this case, application 104 does not record the selected shape command (i.e. is not added it to either the Simplified Shape or an Open Line) and does not update the Current Position variable.

If, at 340, application 104 determines that the selected shape command does not define a negligible line, processing proceeds to 342.

Over operations 342 to 346, application 104 determines if the previously recorded shape command was a straight line command (e.g. a "lineto" command in the SVG context) that defined a straight line with substantially the same angle as the angle of the line defined by the selected shape command. If so, application 104 records the selected line segment by updating the end point of the previously recorded shape command so the previously recorded shape command defines a line that ends at the end point defined by the selected straight line shape command.

At 342, application 104 determines if an Open Line exists. If so, processing proceeds to 344. Otherwise, processing proceeds to 350.

At 344, application 104 determines whether the angle of the line defined by the selected line shape command is substantially the same as the angle defined by the previously recorded straight line shape command. The previously recorded straight line shape command will the last line shape command defined by the Open Line.

Application 104 may determine whether the angles of two lines (e.g. a straight line defined by the selected shape command and a straight line defined by the previously recorded shape command) are the same in various ways. For example application 104 may: calculate actual line angles (based on each line's start/end (x,y) points) and determine if the angles are the same; compare $\Delta y/\Delta x$ for each line (based again on each line's start/end (x,y) coordinates) to determine whether the ratio is the same (without actually calculating an angle); or by other mechanisms.

In the present example, application 104 determines if two lines are substantially the same angle by reference to an angular threshold: if difference between the angles difference by the two lines (e.g. |line 1 angle−line 2 angle|) is less than the angular threshold, application 104 determines the two lines to have substantially the same angle. Conversely, if the distance is greater than or equal to the angular threshold, application 104 determines the two lines do not have substantially the same angle. Any appropriate angular threshold may be used—for example an angular threshold of 0.1 degrees (though alternatives are possible).

In other embodiments, application 104 may not use an angular threshold (or may set the angular threshold to 0), and only proceed to 346 if the angles of the lines are the same.

Depending on the type(s) of straight line command(s) in question, shortcuts may be possible. For example, two horizontal straight line commands ('h' and 'H' in the SVG context) will always be the same angle. Similarly, two vertical straight line commands ('v' and 'V' in the SVG context) will always be the same angle. In these cases no calculations are necessary to determine whether the angles of two lines are the same.

If, at 344, application 104 determines that the angle of the selected (straight line) shape command is the same as the angle defined by the previously recorded (straight line) shape command, processing proceeds to 346. Otherwise, processing proceeds to 348.

At 346, application 104 records the selected shape command. In the present case, this involves effectively extending the previous straight line command so it ends at the end/target point of the selected shape command. To do this, application 104 replaces the last parameters defined by the Open Line with the parameters of the selected shape command.

The specific parameter(s) that are replaced/updated will depend on the type of straight line command. For example, in the SVG context: if the previously recorded shape command was an 'L' or 'l' command, both x and y parameters are replaced; if the previously recorded shape command was a 'H' or 'h' command, an x parameter is replaced; if the previously recorded shape command was a 'V' or 'v' command, a y parameter is replaced. In the Java Graphics API context, horizontal and vertical line shortcuts such as 'H' and 'V' do not exist, so all shape commands require both an x and a y parameter.

To illustrate this, consider a current state in which:

Simplified Shape = " ... M 0 0"
Open Line = "L 10 10"
And a selected shape command of
"L 20 20".

In this example, at 344 application would determine that the angles of the selected shape command and the previously recorded shape command are the same (e.g. $\Delta y/\Delta x$ for the selected shape command=(20−10)/(20−10)=1; $\Delta y/\Delta x$ for the previously recorded shape command=(10−0)/(10−0)=1). At 346 application 104 would then update the Open Line to replace its currently defined end point with the end point of the selected shape command. This would provide an updated state of:

Simplified Shape = " ...M 0 0"
Open Line = "L 20 20"

Once the previously recorded shape command has been updated at 346, processing proceeds to 354 (keeping the currently Open Line open).

At 348, the currently selected shape defines a line of a different angle to the line defined by the previously recorded shape (determined at 344). At 348, application 104 adds the Open Line to the Simplified Shape being generated (e.g. by appending the data of the Open Line variable to the Simplified Shape) and deletes (or otherwise closes) the Open Line variable. Processing then proceeds to 350.

At 350, application 104 initialises a new Open Line variable.

At 352, application 104 records the selected shape command. In this case, application 104 records the selected shape command by adding the selected (straight line) command to the Open Line (initialised at 350).

At 354, application 104 updates the Current Position variable based on the end/target point defined by the selected shape command. In the SVG context, where horizontal and vertical lineto commands are available, the update performed here depends on the type of the selected straight line command:

if the selected command is an angled line command (defining an end/target point with both x and y coordinates), application 104 sets the (x) and (y) values of the Current Position variable to the (x) and (y) parameters of the selected shape command's end/target point;

if the selected command is a horizontal line command (defining an end/target point with only an x coordinate), application 104 sets the (x) value of the Current Position variable to the (x) parameter of the selected shape command's end/target point (without updating the y value of the Current Position Variable); and if the selected command is a vertical line command (defining an end/target point with only a y coordinate), application 104 sets the (y) value of the Current Position variable to the (y) parameter of the selected shape command's end/target point (without updating the x value of the Current Position Variable).

Where horizontal and vertical lineto commands are not available (or not used), e.g. in the Java Graphics API example, updating the Current Position variable is performed by replacing its (x,y) values with the (x,y) values of the target defined by the selected shape command. Processing then returns to 316.

At 360, the selected shape command is a curved line type shape command (e.g. a QuadraticBezier type shape command or a cubic Bezier type shape command).

At 360, application 104 determines whether the selected (curved line) shape command defines a negligible line.

Application 104 may be configured to determine whether the selected (curved line) shape command defines a negligible line in various ways.

For example, application 104 may determine a selected (curved line) shape command defines a negligible line in the same or a similar way as the processing described above at 340.

Alternatively, application 104 may modify the processing described at 340 above to determine not only whether the end/target point of the curve defined by the selected shape command is within the relevant proximity threshold(s), but whether other control points of the curve are also within the relevant proximity thresholds. If the curve's end/target point and all control points are within the relevant proximity threshold(s), application 104 will determine the selected shape to define a negligible line. Conversely, if any of the curve's end/target point or control points equal to or greater than the relevant proximity threshold(s), application 104 will determine the selected shape does not define a negligible line.

The proximity threshold(s) used when determining whether a line defined by a curved line shape command is negligible may be referred to as curved line proximity threshold(s). The curved line proximity threshold(s) will typically be the same as the straight line proximity threshold(s) (described above) however may be different.

If, at 360, application 104 determines that the selected shape command defines a negligible line, application 104 ignores the selected shape command (by not adding it to the Simplified Shape and not updating the Current Position variable) and processing returns to 316.

If, at 360, application 104 determines that the selected shape command does not define a negligible line, processing proceeds to 362.

At 362, and in the present embodiment, application 104 determines if the selected shape command defines a quadratic Bezier shape (e.g. a 'Q', 'q', 'T', or 't' command in the SVG context). If so, processing proceeds to 364. If not, processing proceeds directly to 366.

At 364, application 104 converts the selected shape command (which is a quadratic Bezier shape command) to a cubic Bezier shape. Application 104 may convert a quadratic Bezier shape command to a cubic Bezier shape command in various known ways. Processing then proceeds to 366.

Operations 362 and 364 are performed in the present embodiment in order to address potential compatibility issues that may arise if a given software or hardware platform does not support quadratic Bezier curves. In alternative embodiments, however, operations 368 and 370 may be omitted and quadratic curves may be processed as is/without conversion.

At 366, application 104 determines if the selected curved line type shape command defines a curve that is substantially flat. Application 104 may determine if the selected shape command defines a substantially flat curve in various ways. For example, Application 104 may calculate a curvature value for the curve and compare the curvature value against a defined curvature threshold. If the curvature value is less than the threshold, application 104 will determine the curve to be flat. As one example, application 104 may be configured to determine whether a curve is flat by an approach such as that described in the paper "Piecewise Linear Approximation of Bezier Curves" by Kaspar Fischer, 16 Oct. 2000. In this case, and by way of example, a curvature threshold of 0.1 may be used (though alternative thresholds may be used).

If operation 362 and 364 are not performed (and a quadratic curve is not converted to a cubic curve at 364), some adaptation to 366 may be required to determine whether the quadratic curve shape command defines a 'flat' curve. As one example, however, application 104 may do this by converting the quadratic curve to a cubic curve solely for the purpose of determining 'flatness' at 366.

If, at 366, application 104 determines that the curve defined by the selected shape command is substantially flat, processing proceeds to 368.

At 368, application 104 converts the selected curved line type shape command into a new straight line type shape command. In the SVG context this involves replacing the original quadratic or cubic command identifier (e.g. 'Q', 'q', 'T', 't', 'C', 'c', 'S', or 's') with a straight line identifier (e.g. 'L' or 'l'), retaining the original end/target points of the curved shape command, and deleting the control point parameters of the curved shape command.

Following conversion of the curved line to a straight line, application 104 records the straight line. In the present example, to record the newly converted straight line application 104 performs operations that mirror operations 342 to 354 above. These operations have been depicted in FIG. 3 (as operations 370 to 382) but will not be described again in detail. Briefly, however, they involve application determining if an open line exists at 370 (as per 340) and if so determining if the straight line generated at 368 has substantially the same angle as the previously recorded straight line at 372 (as per 344). If so, application records the new straight line by extending the previous straight line shape command at 374 (as per 346). If an Open Line exists but defines a line with an angle that is not substantially the same as the newly converted straight line, application 104 adds the Open Line to the Simplified Shape at 376 (as per 348), initialises a new Open Line at 378 (as per 350), adds the straight line shape command generated at 368 to the new Open line at 380 (as per 352), then updates the Current Position at 382. If no Open Line exists, processing proceeds to 378 (as per 350).

If, at 366, application 104 determines that the curve defined by the selected shape command is not flat, processing proceeds to 384.

At 384, application 104 determines if an Open Line exists. If so, processing proceeds to 386. Otherwise, processing proceeds directly to 388.

At 386, application 104 adds the Open Line to the Simplified Shape being generated, e.g. by appending the data in the Open Line variable to the Simplified Shape. Application 104 then deletes (or otherwise closes) the Open Line variable. Processing then proceeds to 388.

At 388, application 104 adds the currently selected shape command to the Simplified Shape. To do so, application 104 appends the selected shape command (converted to a cubic Bezier at 364 if performed) to the Simplified Shape. The shape command appended to the Simplified Shape may be referred to as the compressed version of the selected shape command. Processing then proceeds to 382.

At 382, application 104 updates the Current Position variable based on the end/target point defined by the selected shape command. Processing then proceeds to 316.

At 390, the selected shape command is a close path type shape command.

At 390, application 104 determines if an Open Line exists. If an Open Line exists, processing proceeds to 392. Otherwise, processing proceeds directly to 394.

At 392, application 104 adds the Open Line to the Simplified Shape being generated. To do so, application 104 appends the data in the Open Line to the Simplified Shape. Application 104 then deletes (or otherwise closes) the Open Line variable. Processing then proceeds to 394.

At 394, application 104 records the selected shape command. In this case, application 104 records the selected shape command by adding (e.g. appending) the selected shape command to the Simplified Shape.

At 396, application 104 updates the Current Position variable. As the selected shape command is a close path type shape command, application 104 updates the Current Position variable by setting the (x,y) coordinates of the Current Position variable to the (x,y) coordinates defined by the Last Move variable. Processing then returns to 316.

It will be appreciated that simplification process 300 provides various mechanisms for simplifying a shape. For example, process 300 includes simplification mechanisms of: a parameter reduction mechanism (which involves determining a maximum number of decimals places at 314 and reducing shape command parameters accordingly at 322); a straight line omission mechanism (which involves determining if a straight line type command defines a negligible line at 340 and, if so, not recording that shape command in the Simplified Shape); a straight line combining mechanism (which involves determining if two consecutive line type shape commands define straight lines with substantially the same angle at 344 and, if so, recording a single straight line type shape command in the Simplified Shape at 346 instead of two separate straight line type shape commands); a curved line omission mechanism (which involves determining if a curved line type command defines a negligible line at 360 and, if so, not recording that shape command in the Simplified Shape); a curve flattening mechanism (which involves determining if a curved type straight line can be converted to a straight line at 366 and, if so, recording a straight line type shape command in the Simplified Shape instead of the original curved line type shape command). In alternative embodiments, instead of making use of all of these mechanisms a simplification process may implement one of these mechanisms or a subset of these mechanisms.

Figure 4:
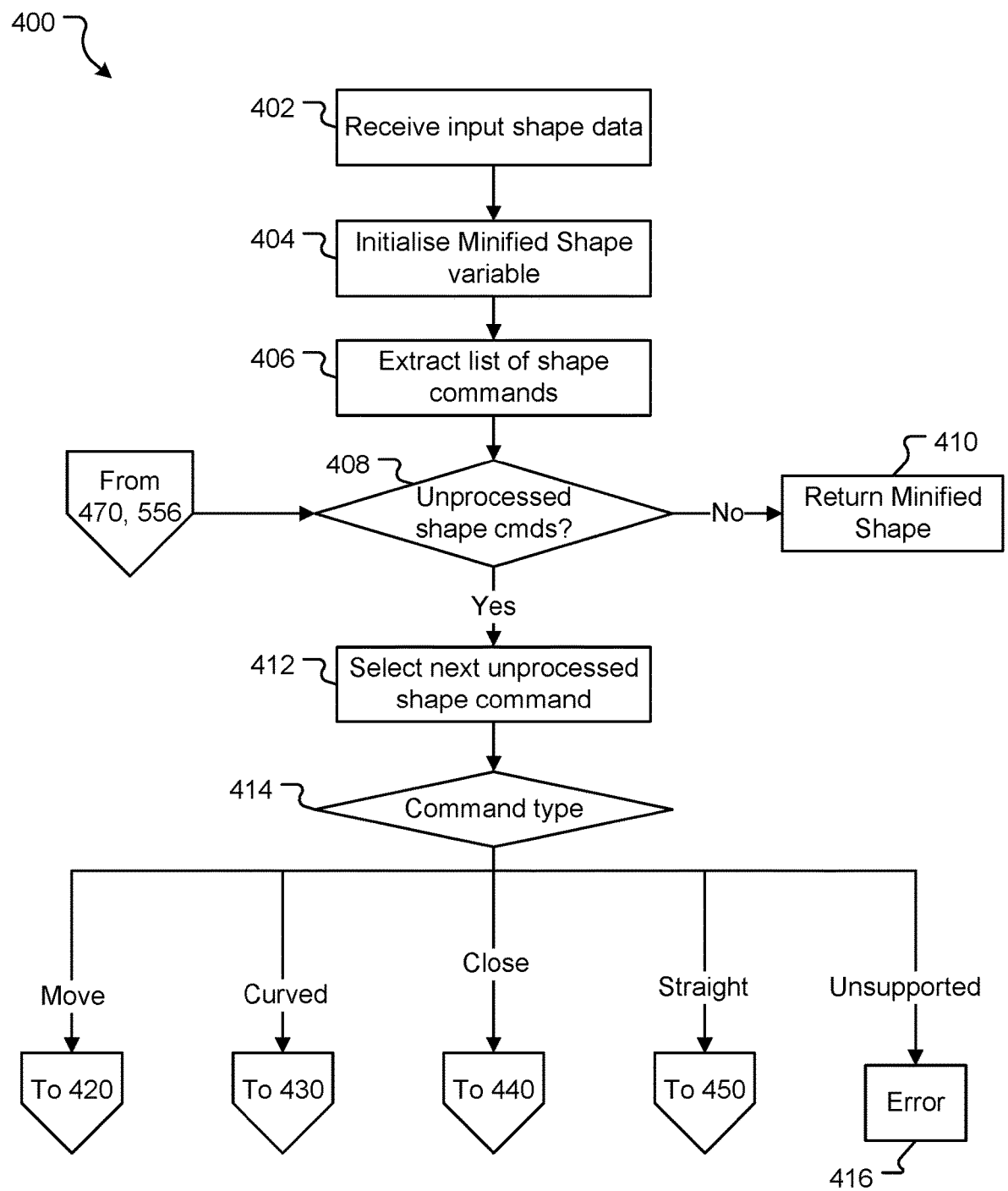
FIG. 4 depicts operations performed in a vector graphic minification process.
Figure 4:
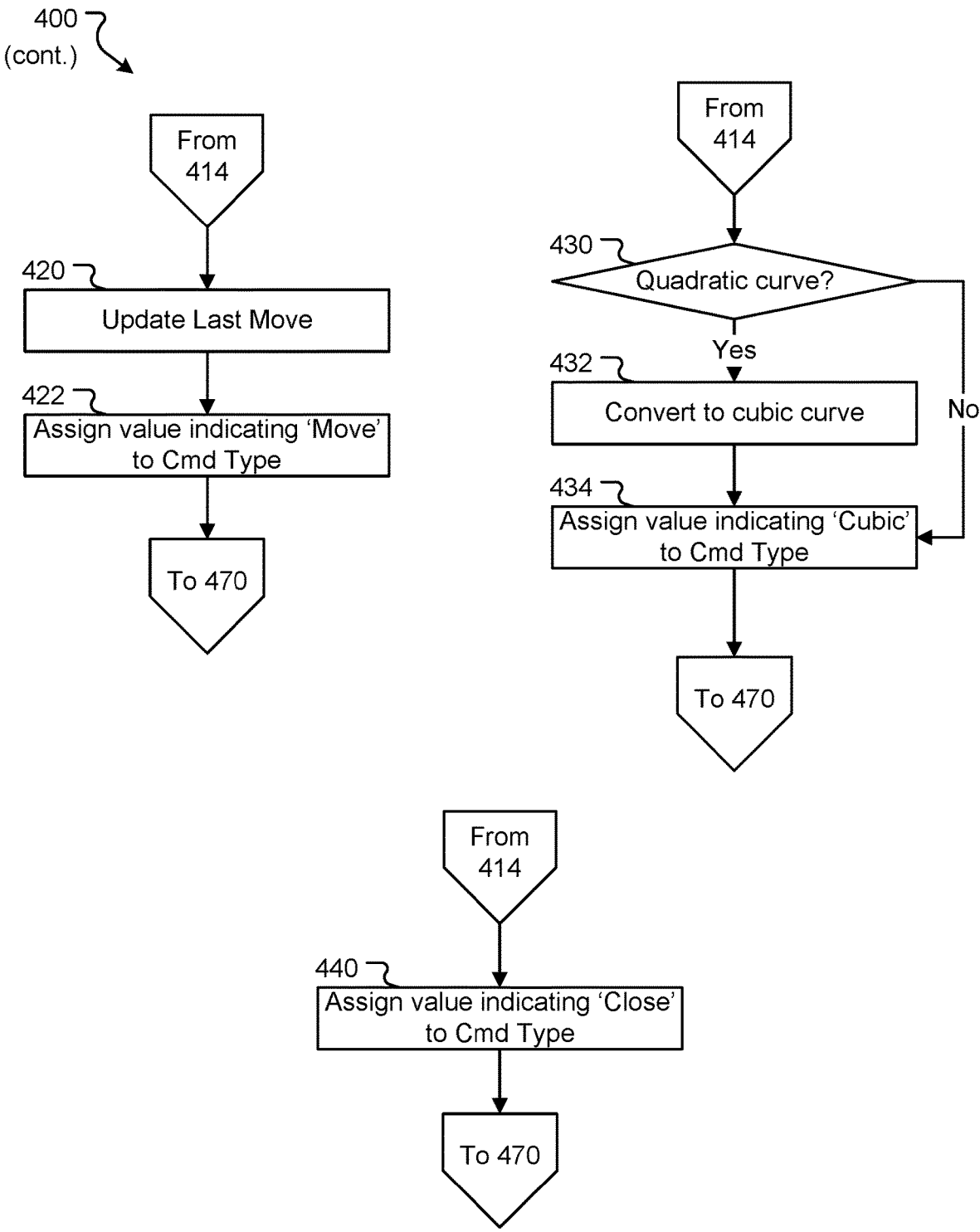
Figure 4:
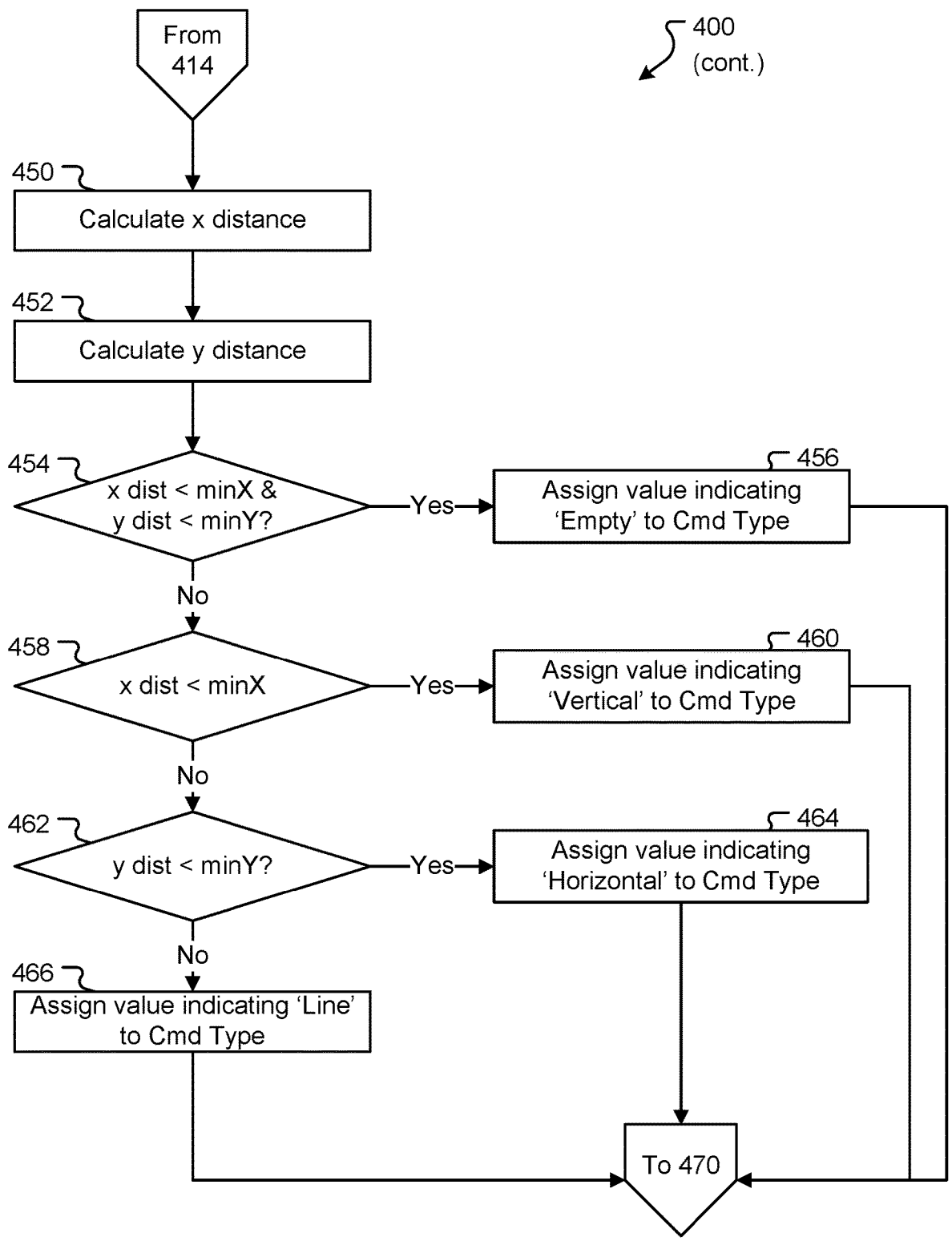
Figure 4:
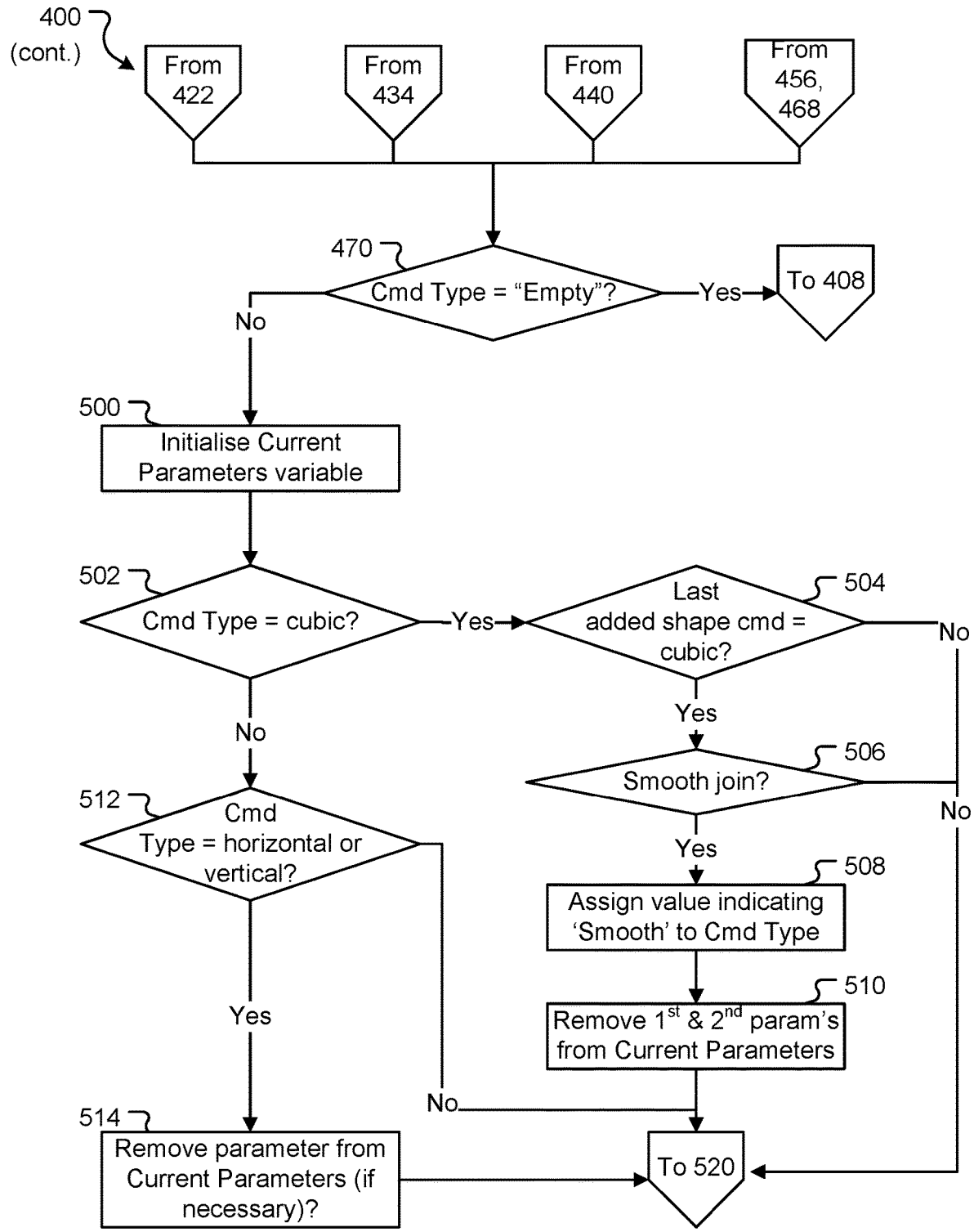
Figure 4:
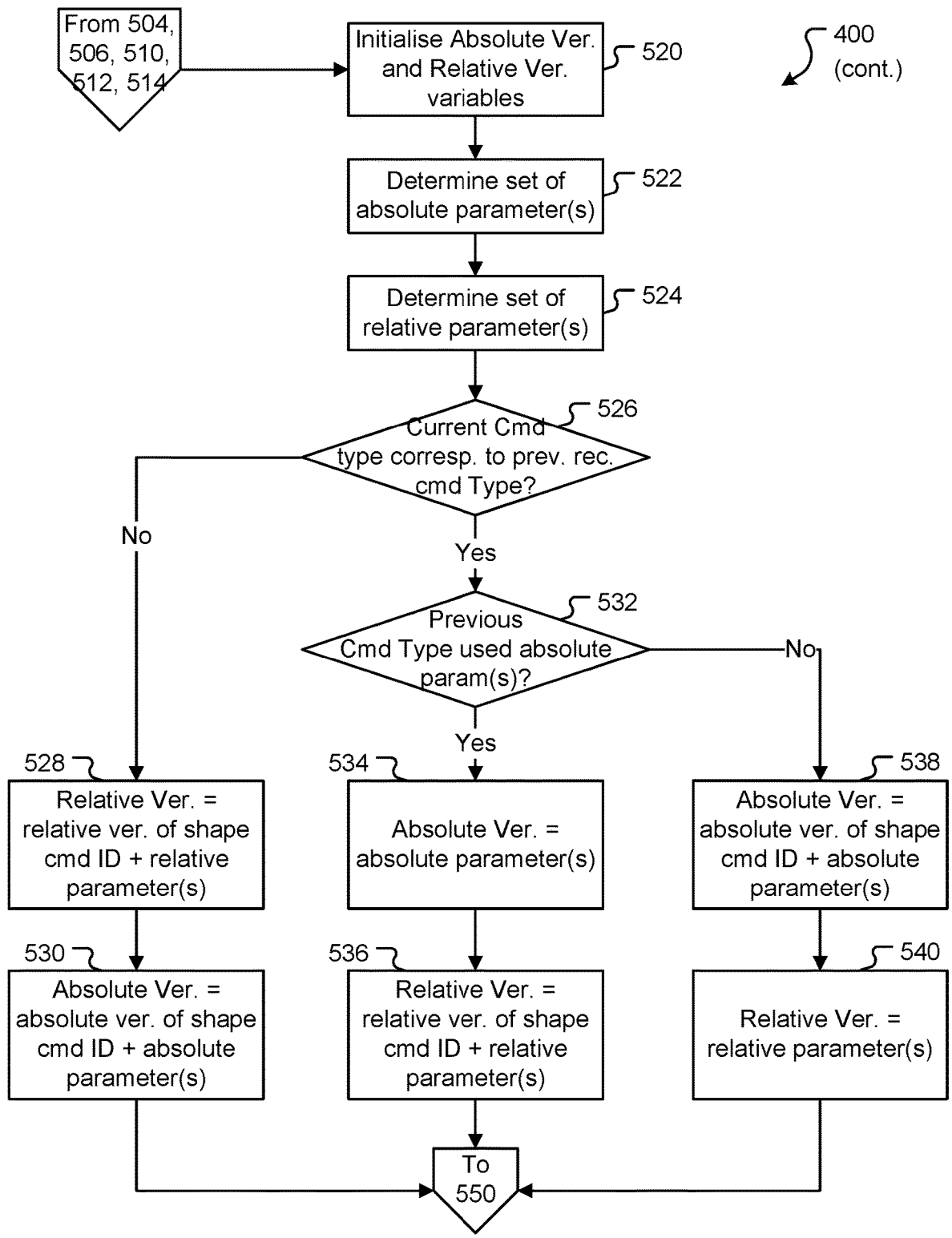
Figure 4:
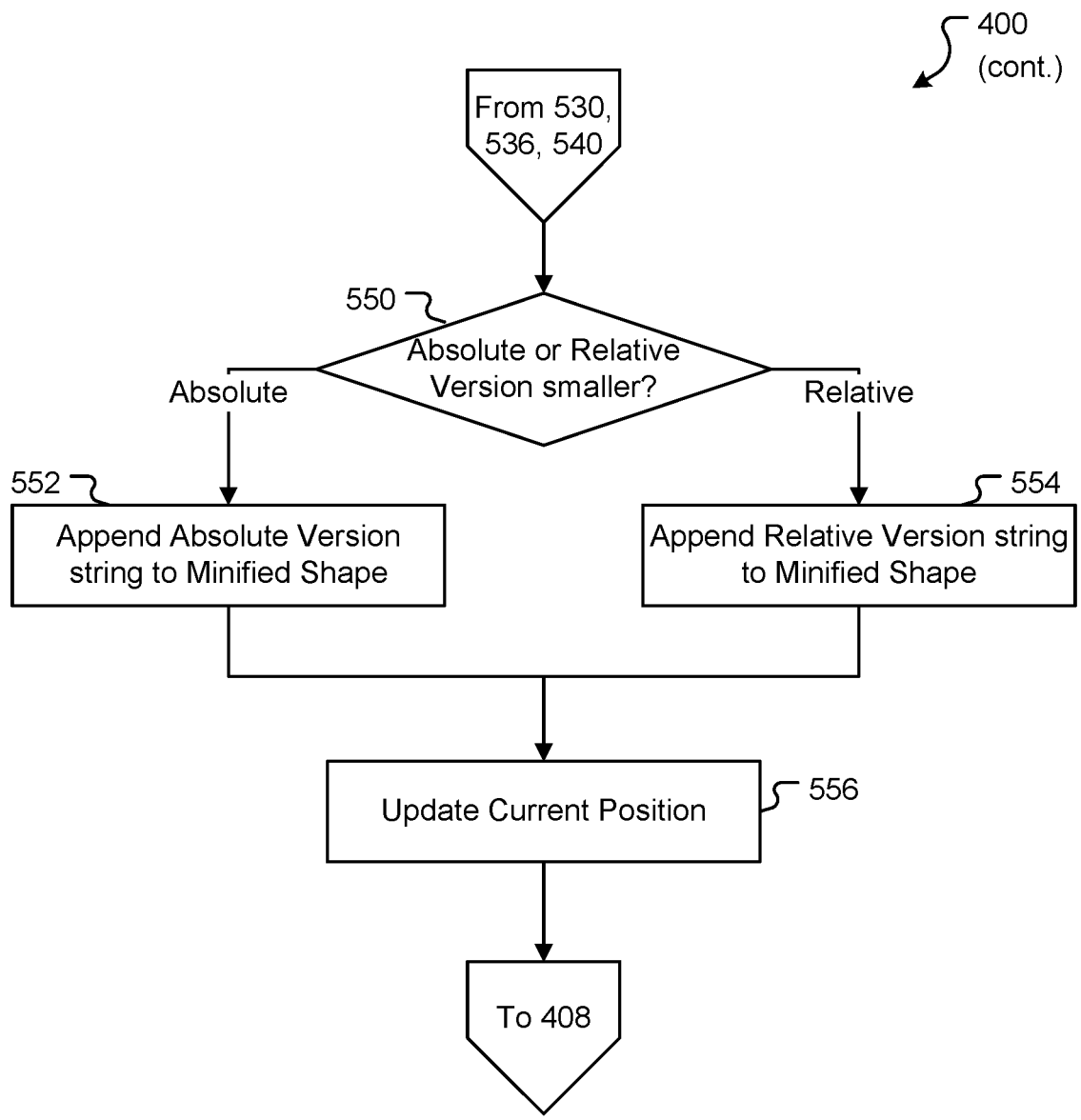

Turning to FIG. 4, a second vector graphic compression process 400 will be described. This will be referred to as a minification process. Generally speaking, minification process 400 is a lossy compression process that takes vector graphic shape data as input and returns a minified (e.g. compressed) version of the shape defined by the input shape data.

Over the course of process 400, application 104 makes use of a Minified Shape variable (e.g. a string), a Last Move variable (e.g. a string), a Current Position variable (e.g. a string), a Command Type variable (e.g. a string), an Absolute Command Version variable (e.g. a string), and a Relative Command Version variable (e.g. a string).

The Minified Shape variable is populated with shape commands over the course of the simplification process and eventually returned by process 400. The Minified Shape variable may also be referred to as a Compressed Shape, in that its data defines a compressed version of the input shape. Furthermore, each shape command that is added to the Minified Shape over the course of process 300 corresponds to an input shape command (i.e. a shape command of the original shape being processed). A shape command added to the Minified Shape (or Compressed Shape) variable may, therefore, be referred to as a compressed version of its corresponding input shape.

The Last Move variable stores the x and y coordinates of the last move type command that was processed. The x and y coordinates stored by the Last Move variable are expressed as absolute coordinates.

The Current Position variable is used to store a current position (e.g. (x,y) coordinate pair). The x and y coordinates stored by the Current Position variable are expressed as absolute coordinates.

In alternative implementations, instead of maintaining a Last Move and/or a Current Position variable over the course of process 400, application may instead be configured to determine the last move coordinates and/or current position coordinates by inspecting the Minified Shape variable. This may be similar to the handling of the Last Move and Current Position variables as described above with reference to process 300 (excepting process 400 maintains a Minified Shape rather than a Simplified Shape).

The Command Type variable is used to record a general type of the shape command currently being processed.

The Absolute Command Version variable is used to temporarily store an absolute version of the shape command currently being processed (i.e. a version in which the absolute version of the relevant command identifier is used (if required) and that includes relatively expressed parameter(s)).

The Relative Command Version variable is used to temporarily store a relative version of the shape command currently being processed (i.e. a version in which the relative version of the relevant command identifier is used (if required) and that includes relatively expressed parameter(s)).

At 402, application 104 receives input shape data in respect of an input shape. The input shape defines one or more shape commands. The input shape data is in a vector graphic format, for example a SVG path or a Shape object described by the Java Graphics API.

The input shape data may, though need not, be Simplified Shape data as generated by simplification process 300 described above.

At 404, application 104 initialises the Minified Shape variable (in the present embodiment as an empty string).

At 406, application 104 extracts a list of shape commands from the input shape data. This may be performed in the same (or a similar) way to operation 304 described above.

Over the course of process 400, application 104 processes each shape command in the list of shape commands extracted at 406. Any appropriate processing loop may be used to process the shape commands, the loop generally involving selecting the shape commands from the list generated at 406 in order and processing each shape command according to the described operations.

At 408, therefore, application 104 determines if there are any unprocessed shape commands in the list of shape commands. If all shape commands have been processed, processing proceeds to 410. Otherwise, processing proceeds to 412.

At 410, all shape commands for the current shape have been processed. In this case application 104 returns the Minified Shape (as initialised at 404 and updated over the course of process 400).

If any additional data needs to be added to the Minified Shape (e.g. to comply with the requirements of the vector graphic format in question), such data can be added to the Minified Shape by application 104 before returning it, or can be added by another application or process after the Simplified Shape has been returned. Where additional data is required some or all of it may be taken from (or based upon) corresponding data from the input shape.

Once generated, the Minified Shape can be used (or further adapted to be used) in various ways. For example it can be saved as a standalone vector graphic, rendered on a display, converted into an alternative image format (e.g. a raster image format), incorporated into a larger vector graphic or design (that can in turn be saved, rendered, converted, shared, or otherwise used).

At 412, there are unprocessed shape commands and application 104 selects the next unprocessed shape command for processing. The shape command selected at 412 will be referred to as the selected shape command. The shape command selected at 412 may also be referred to as a first shape command (noting that first here is used as a label rather than in an ordinal sense, and there may well be previous shape commands processed in previous processing loops of process 400).

At 414, application 104 determines a type of the selected shape command based, in this example, on its command identifier, and proceeds to perform an evaluation process on the selected shape command based on its type. As described in detail below, the evaluation process includes populating the Command Type variable with an indication of the type of a new shape command that will eventually be generated for the selected shape command and added to the Minified Shape string.

The present example is provided in the context of SVG shape data, and in this context the shape command type may be: a move type shape command (e.g. with command identifier 'M' or 'm' in the SVG context or "Move To" in the Java context), in which case processing proceeds to 420 to evaluate the selected shape command; a curved line type shape command—e.g. a quadratic Bezier command (with command identifier 'Q', 'q', 'T', or 't' in the SVG context or "Quadratic Curve To" in the Java context) or a cubic Bezier command (with command identifier 'C', 'c', 'S', or 's' in the SVG context or "Cubic Curve To" in the Java context), in which case processing proceeds to 420 to evaluate the selected shape command; a close path type shape command (e.g. with command identifier 'Z' or 'z' in the SVG context or "Close Path" in the Java context), in which case processing proceeds to 440 to evaluate the selected shape command; or a straight line type shape command (e.g. with command identifier 'L', 'l', 'H', 'h', 'V', or 'v' in the SVG context or "Line To" in the Java context), in which case processing proceeds to 450 to evaluate the selected shape command.

If, at 414, an unsupported command type is encountered, processing proceeds to 416. Application 104 may handle unsupported command types in various ways. In the present example, where an unsupported command type is encountered application 104 generates and returns an error.

In other implementations, however, application may be configured (at least for certain unsupported command types) to handle the unsupported shape command by adding it to the Minified Shape and updating the Current Position variable based on the known end point (e.g. as described above with reference to operation 324.

At 420, the selected shape command is a move type shape command.

At 420, application 104 updates the Last Move variable to record the target point defined by the selected (move type) shape command.

At 422, application 104 assigns a value to the Command Type variable that indicates a move type shape command is to be generated. In the present example this value is 'Move', however an alternative value may be used. Processing then proceeds to 470.

Curved Line Type Shape Command Evaluation

At 430, the selected shape command is a curved line type shape command (e.g. a QuadraticBezier type shape command or a cubic Bezier type shape command).

At 432, and in the present embodiment, application 104 determines if the selected shape command defines a quadratic Bezier shape (e.g. a 'Q', 'q', 'T', or 't' command in the SVG context). If so, processing proceeds to 432 where application 104 converts the selected shape to a cubic Bezier shape command before processing continues to 434. Conversion of a quadratic Bezier to a cubic Bezier is described above with reference to operation 364.

If, at 430, the selected shape command is already a cubic Bezier shape, processing proceeds directly to 434.

Operations 430 and 432 are performed in the present embodiment in order to address potential compatibility issues that may arise if a given software or hardware platform does not support quadratic Bezier curves. In alternative embodiments, however, operations 430 and 432 may be omitted.

At 434, application 104 assigns a value to the Command Type variable that indicates a cubic Bezier type shape command is to be generated. In the present example this value is 'Cubic', however an alternative value may be used. Processing then proceeds to 470.

At 440, the selected shape command is a close path type shape command.

In this case, application 104 assigns a value to the Command Type variable that indicates a close type shape command is to be generated. In the present example this value is 'Close', however an alternative value may be used. Processing then proceeds to 470.

At 450, the selected shape command is a straight line type shape command.

In the case of a straight line type command, application 104 identifies whether line defined by the command is: negligible (in which case it is ignored entirely); substantially vertical (in which case it is flagged as a vertical line); substantially horizontal (in which case it is flagged as a horizontal line); or none of these (in which case it is defined as an angled line).

At 450, application 104 calculates a horizontal (e.g. x) distance travelled by the current line (i.e. the line defined by the selected shape command). To do so, application 104 calculates the absolute value of the difference between the x coordinate defined by the selected shape command and the x coordinate of the end/target point defined by the previously recorded shape command (i.e. the last shape command appended to the Minified Shape string).

At 452, application 104 calculates a vertical (e.g. y) distance travelled by the current line. To do so, application 104 calculates the absolute value of the difference between the y coordinate defined by the selected shape command and the y coordinate of the end/target point defined by the previously recorded shape command.

At 454, application 104 determines whether the current line is negligible. In the present example, this is done by determining whether the current line's horizontal distance is less than a defined horizontal threshold (also referred to as minX) and the current line's vertical distance is less than a defined vertical threshold (also referred to as minY). If (horizontal distance<horizontal threshold & vertical distance<vertical threshold), application 104 determines that the line is negligible and processing proceeds to 456. Otherwise processing proceeds to 458.

At 456, application 104 has determined the current line is negligible. In this case application 104 assigns a value to the Command Type variable that indicates no shape command needs to be generated. In the present example this value is 'Empty', however an alternative value may be used. Processing then proceeds to 470.

At 458, application 104 has determined that the current line is not negligible. In this example, application then determines whether the current line is substantially vertical. In the present example, this is done by determining whether the horizontal distance calculated at 450 is less than the defined horizontal threshold. If. At 458, (horizontal distance<horizontal threshold), application 104 determines that the line is substantially vertical and processing proceeds to 460. Otherwise processing proceeds to 462. In the present example, and given the determination made at 454, if application determines that (horizontal distance<horizontal threshold) at 458 this means that the vertical distance must be greater than or equal to the vertical threshold.

At 460, application 104 has determined the current line is substantially vertical. In this case application 104 assigns a value to the Command Type variable that indicates a vertical line shape command is to be generated. In the present example this value is 'Vertical', however an alternative value may be used. Processing then proceeds to 470.

At 462, application 104 has determined that the current line is neither negligible nor substantially vertical. Application 104 then determines whether the current line is substantially horizontal. In the present example, this is done by determining whether the current line's vertical distance is less than the defined vertical threshold. If, at 462 (vertical distance<vertical threshold) (and, per determination 458, it is known that the horizontal distance greater than or equal to the horizontal threshold), application 104 determines that the line is substantially horizontal and processing proceeds to 464. Otherwise processing proceeds to 466.

At 464, application 104 has determined the current line is substantially horizontal. In this case application 104 assigns a value to the Command Type variable that indicates a horizontal line shape command is to be generated. In the present example this value is 'Horizontal', however an alternative value may be used. Processing then proceeds to 470.

At 466, application 104 has determined that the current line is not negligible (at 454), not substantially horizontal (at 458), and not substantially vertical (at 462). In this case application 104 determines that the line is an angled line. In this case, application 104 assigns a value to the Command Type variable that indicates a normal (or angled) line shape command is to be generated. In the present example this value is 'Line', however an alternative value may be used. Processing then proceeds to 470.

Application 104 performs the determinations of 454, 458, and 462 with reference to defined horizontal and/or vertical threshold values. The defined horizontal and vertical thresholds will typically be the same, however different thresholds could be used. Furthermore, while the same thresholds have been described as being used to determine whether a line is negligible, substantially horizontal, or substantially vertical, different thresholds could be used for these determinations. By way of example, the horizontal and vertical thresholds may be set to a value of $10^{-8}$, however alternative values could be used. The selected value provides a trade-off: higher threshold values will result in greater shape minification, however will also cause more changes to be made to (and therefore greater degradation of) the original shape.

At 470, following the evaluation of the selected shape command, application 104 determines if the Command Type variable indicates that there is no shape command to be generated. In the present example, this will be the case if the value of the Command Type variable is "Empty". If there is no shape command to be processed, processing returns to 408 to select the next shape command from the input shape data for processing (if one exists).

If, at 470, the shape command valuation variable indicates there is a shape command to be generated (which, in this example, will be the case if the Command Type variable is anything but "Empty"), application 104 proceeds to generate a new shape command that corresponds to the selected shape command (and, in due course, is added to the Minified Shape string). This processing is described with reference to operations 500 to 554.

In the present embodiments, when generating a new shape command that corresponds to the selected shape command application 104 generates two shape commands: an absolute command (which uses the absolute version of the relevant command identifier/operator and absolute parameters) and a relative command (which uses the relative version of the relevant command identifier and relative parameters). The absolute and relative commands are then compared to one another and the shorter (or equal shorter) of the two is selected and added to the minified shape string that is being generated. This is described in detail below.

At 500, application 104 initialises a Current Parameters variable. In the present example, the Current Parameters variable is an ordered list and is initialised with items corresponding to the parameter(s) of the selected shape command (in order).

At 502, application 104 determines whether the value of the current Command Type variable indicates a cubic shape type command. In the present example this will be the case if the Command Type variable="Cubic". If so, processing proceeds to 504. If not, processing proceeds to 512.

At 504, application 104 determines if the last shape command added to the Minified Shape was also a cubic shape type command (e.g. with a 'C', 'c', 'S', or 's' command identifier in the SVG context). If so, processing proceeds to 506. If not, processing proceeds to 520.

At 506, application 104 has determined that the values of both the current and previously processed Command Type variables indicated a cubic type shape command (as determined at 502 and 504 respectively). In this case, application 104 determines whether the join between the curve defined by selected shape command and the curve defined by the previously processed shape command is a smooth join. If the join is smooth, processing proceeds to 508. If not, processing proceeds to 520.

Application 104 may be configured to determine whether the join between two curves (e.g. the current curve defined by the selected shape command and the previous curve defined by the last shape command added to the Minified Shape variable) are smooth in various ways.

For example, in the SVG context a cubic Bezier curve (command 'C' or 'c') is defined by six parameters: $x_1$ $y_1$ (which define a first/initial control point); $x_2$ $y_2$ (which define a second/final control point); and $x_t$ $y_t$ (which define the curve's end/target point). The cubic Bezier curve also has a start point (which may be to as $x_s$ $y_s$), though this is not defined by the curve command itself but rather by the end point of the previous shape command (in this example, the shape command that was last added to the Minified Shape variable). To determine if the join between two cubic Bezier curves (a current curve and a previous curve) is smooth, application 104 may, for example calculate:

$dx1$=selected shape control point 1 $x$–current position $x$ $dy1$=selected shape control point 1 $y$–current position $y$ $dx2$=current position $x$–last shape control point 2 $x$ $dy2$=current position $y$–last shape control point 2 $y$ where
  selected shape control point 1 x=x coordinate of the current shape command's first control point;
  selected shape control point 1 y=y coordinate of the current shape command's first control point;
  last shape control point 2 x=x coordinate of the last shape command's second control point (i.e. the last shape command added to the Minified Shape string);
  last shape control point 2 y=y coordinate of the last shape command's second control point (i.e. the last shape command added to the Minified Shape string);
  current position x=the target x coordinate defined by the last shape command added to the Minified Shape string (i.e. the same shape command defining control point 2); and
  current position y=the target x coordinate defined by the last shape command added to the Minified Shape string (i.e. the same shape command defining control point 2); and Following calculation of these values, application 104 can determine that the join is smooth if dx1 equals dx2 (potentially within a defined tolerance) AND dy1 equals to dy2 (potentially within a defined tolerance). Any appropriate defined tolerance may be used.

Alternatively, to determine if a join is smooth application 104 may: calculate a first length and a first angle of a first line that joins the previous curve's second control point and its end point; calculate a second length and a second angle of a second line that joins the current curve's start point and its first control point; determine that the join is smooth if the first length equals the second length (potentially within a defined tolerance) and the first angle equals the second angle (potentially within a defined tolerance); determine that the join is not smooth if the first length does not equals the second length (potentially within a defined tolerance) or the first angle does not equal the second angle (potentially within a defined tolerance).

At 508, application 104 has determined the join between the current and previous curves is smooth. In this case, application 104 updates the Command Type variable to a value that indicates a smooth curve. In the present example the value "Smooth" is used, however alternative values could be used. At 510, application 104 then updates the Current Parameters variable to remove the first two parameters therefrom (i.e. the first and second control point parameters as defined by the selected cubic Bezier shape command). Processing then proceeds to 520.

At 512, application 104 has determined that the value of the Command Type variable does not indicates a cubic shape type command. At 512, application 104 determines whether the value of the current Command Type variable indicates a horizontal type command or a vertical type command. If so, the Command Type variable indicates either horizontal or vertical, processing proceeds to 514. Otherwise, processing proceeds to 520.

At 514, application 104 determines if a parameter should be removed from the Current Parameters variable and, if so, removes that parameter.

At 514, and in the SVG context, a parameter will need to be removed from the Current Parameters variable if the selected shape command is an angled line type command (e.g. an 'L' or 'l' command in the SVG context). In this case, and noting that the Command Type indicates that the selected shape command is to be turned into a horizontal or vertical line, either the x or y parameter of the selected shape command, which has been copied over to the Current Parameters variable at 500, will need to be deleted from the Current Parameters variable.

Specifically:
  if the selected command is a 'L' or 'l' command, and the Command Type variable indicates horizontal, application 104 deletes the y parameter from the Current Parameters variable;
  if the selected command is 'L' or 'l' command, and the Command Type variable indicates vertical, application 104 deletes the x parameter from the Current Parameters variable;
  if the selected command is a 'H' or 'h' command, and the Command Type variable indicates horizontal, no update to the Current Parameters variable is required; and
  if the selected command is a 'V' or 'v' command, and the Command Type variable indicates vertical, no update to the Current Parameters variable is required.

Over the course of operations 520 to 540, application 104 generates an absolute version of the selected shape command and a relative version of the selected shape command. The absolute version of the selected shape command makes use of an absolute command identifier (if this is needed) and absolute parameters (i.e. parameters that are expressed as absolute coordinates). The relative version of the selected shape command makes use of a relative command identifier (if this is needed) and relative parameters (i.e. parameters that are expressed as relative coordinates). Once both versions have been generated, application 104 selects the shortest (or equal shortest) version to add to the Minified Shape that is being generated. Choosing the shortest version can provide for a shape that is defined by less data than would otherwise be the case. Amongst other things, this means that less memory is required to store the shape.

At 520, application 104 initialises an Absolute Version variable and a Relative Version variable. These variables are used to temporarily store absolute and relative versions of the selected shape command. In the present example, the Absolute Version variable and Relative Version variable are each initialised as an empty string. Processing then proceeds to 522.

At 522, application 104 determines a set of one or more absolute parameters for the selected shape command. The parameter(s) in the set of absolute parameters is/are used in due course to generate the absolute version of the selected shape command.

If the selected shape command already expresses parameters absolutely, the set of absolute parameters determined at 522 is the set of parameters in the Current Parameters variable.

If the selected shape command does not express parameters absolutely, application 104 determines the set of absolute parameters by processing the relatively expressed parameters in the Current Parameters variable to convert them to absolute parameters.

Application 104 may be configured to convert relative parameters to absolute parameters by recalculating parameters based on the selected shape command's relatively expressed parameters and the Current Position variable. For example, if the current (relatively expressed) shape command is "l 5 −5" and the Current Position (expressed as absolute coordinates) is 10, 10), the corresponding (absolutely expressed) shape command is "L 15 5". More generally, if the relatively expressed target of the selected shape is $(x_t, y_t)$ and the current position (absolutely expressed) is $(x_c, y_c)$, then:

$$\text{absolute } x \text{ coordinate} = x_c + x_t$$

$$\text{absolute } y \text{ coordinate} = y_c + y_t.$$

In the present example, application 104 is also configured to remove any superfluous zeros and superfluous spaces between parameters at 522. For example, if parameters were "0.98 0.56 0.12" application 104 would generate the string "0.98.56.12" (removing the superfluous '0' from each parameter and the space between each parameter which is not needed due to the parameters being decimals).

Application 104 may store the set of absolute parameters (either as taken from the Current Parameters List or converted) in an Absolute Parameters variable (e.g. a string, ordered list, or other variable type).

At 524, application 104 determines a set of one or more relative parameters for the selected shape command. The parameter(s) in the set of relative parameters is/are used in due course to generate the relative version of the selected shape command.

If the selected shape command already expresses parameters relatively, the set of relative parameters determined at 524 is the set of parameters in the Current Parameters variable.

If the selected shape command does not express parameters relatively, application 104 determines the set of relative parameters by processing the absolutely expressed parameters in the Current Parameters variable to convert them to relative parameters.

Application 104 may be configured to convert absolute parameters to relative parameters by recalculating parameters based on the selected shape command's absolutely expressed parameters and the Current Position variable. E.g. if the current (absolutely expressed) shape command is "L 20 20" and the current position (expressed as absolute coordinates) is (30, 10), the corresponding (relatively expressed) shape command is "L −10 10". More generally, if the absolutely expressed target of the selected shape is $(x_t, y_t)$ and the current position (absolutely expressed) is $(x_c, y_c)$, then:

$$\text{relative } x \text{ coordinate} = x_t - x_c$$

$$\text{relative } y \text{ coordinate} = y_t - y_c.$$

Application 104 may store the set of relative parameters (either as taken from the Current Parameters List or converted) in a Relative Parameters variable (e.g. a string, ordered list, or other variable type).

In the present example, application 104 is also configured to remove any superfluous zeros and superfluous spaces between parameters at 524 (for example as described at 522 above).

At 522 and 524, application 104 can be configured to determine whether the selected shape command expresses parameters absolutely or relatively by inspecting the command identifier of the selected shape command. For example, and in the SVG context, if the command identifier of the selected shape command is a capital letter identifier (e.g. 'L'), then the parameters are expressed as absolute parameters. Conversely, if the command identifier of the selected shape command is a lower case letter identifier (e.g. 'l'), then the parameters are expressed as relative parameters.

At 526, application 104 determines whether the current command type corresponds to the previously recorded command type.

The current command type is defined by the value of the Command Type variable.

The previously recorded command type is the type of the shape command that was last added to the Minified Shape string.

At 526, application 104 will determine that the current command type corresponds to the previously recorded command type if they indicate the same general type of command, disregarding absolute/relative versions of the shape command identifiers. For example, the table below shows the absolute and relative command identifiers (in the SVG context) that correspond to the example Command Type values described above:

| Command Type value | Corresponding SVG command identifier (absolute version) | Corresponding SVG command identifier (relative version) |
|---|---|---|
| "Move" | 'M' | 'm' |
| "Close" | 'Z' | 'z' |
| "Horizontal" | 'H' | 'h' |
| "Vertical" | 'V' | 'v' |
| "Line" | 'L' | 'l' |
| "Cubic" | 'C' | 'c' |
| "Smooth" | 'S' | 's' |

If, at 526, application 104 determines that the current command type does not correspond to the previously recorded command type, processing proceeds to 528.

At 528 and 530, application 104 populates the Absolute Version string and the Relative Version string for the selected shape command. In these operations, the current and previous command types are not the same (as determined at 526). Given this, when generating both the Absolute Version and the Relative Version of the selected shape command, application 104 includes the relevant shape command identifier.

At 528, application 104 populates the Absolute Version variable with the absolute version of the relevant shape command identifier and the absolute parameter(s) determined at 522.

At 530, application 104 populates the Relative Version variable with the relative version of the relevant shape command identifier (see table above) and the relative parameter(s) determined at 524.

The table above indicates each example Command Type value that has been described herein, along with the absolute and relative command identifier versions (in the SVG context) that are relevant to that Command Type value.

To illustrate operations 528 and 530, consider an example in which the command type value is "Line", the absolute parameters are "10 10" and the relative parameters are "1 2". In this case:

Absolute Version (as populated at 528)="L 10 10"
Relative Version (as populated at 530)="l 1 2"

Following population of the Absolute Version and Relative Version variables, processing proceeds to 550.

If, at 526, application 104 determines that the current command type does correspond to the previously recorded command type, processing proceeds to 532.

At 532, application 104 determines whether the previously recorded shape command used absolute parameters or relative parameters. To make this determination application 104 inspects the Minified Shape string to identify the last command identifier that was added to it. In the SVG context, if the last command identifier added to the Minified Shape string was a capital letter then the previously recorded shape command used absolute parameters. Conversely, if the last command identifier added to the Minified Shape string was a lower case letter then the previously recorded shape command used relative parameters.

If, at 532, application 104 determines that the previously recorded shape command used absolute parameters, processing proceeds to 534.

At 534 and 536, application 104 populates the Absolute Version string and the Relative Version string for the selected shape command. In these operations, the current command type corresponds to the previously recorded command type (as determined at 526) and the previously recorded shape command used absolute parameters (as determined at 532). Given this, and at least in the SVG context, when generating the absolute version of the selected command string, application 104 can omit the relevant shape command identifier. When generating the relative version of the selected command string, however, application 104 must include the relevant shape command identifier (given the previously recorded shape command used absolute parameters).

Omission of a shape command identifier takes advantage of the SVG syntax feature which allows a command identifier to be omitted if it is the same as the immediately preceding command identifier (as described above).

At 534, application 104 populates the Absolute Version variable with the absolute parameter(s) determined at 522.

At 536, application 104 populates the Relative Version variable with the relative version of the relevant shape command identifier (see table above) and the relative parameter(s) determined at 524.

To illustrate operations 534 and 536, consider the above example in which the command type value is "Line", the absolute parameters are "10 10" and the relative parameters are "1 2". In this case:

Absolute Version (as populated at 534)="10 10"
Relative Version (as populated at 536)="l 1 2"

Following population of the Absolute Version and Relative Version variables, processing proceeds to 550.

If, at 532, application 104 determines that the previously recorded shape command used relative parameters, processing proceeds to 538.

At 538 and 540, application 104 populates the Absolute Version string and the Relative Version string for the selected shape command. In these operations, the current command type corresponds to the previously recorded command type (as determined at 526) and the previously recorded shape command used relative parameters (as determined at 532). Given this, and at least in the SVG context, when generating the relative version of the selected command string, application 104 can omit the relevant shape command identifier. When generating the absolute version of the selected command string, however, application 104 must include relevant shape command identifier (given the previous shape command used relative parameters).

At 538, application 104 populates the Absolute Version variable with the absolute version of the relevant shape command identifier and the absolute parameter(s) determined at 522.

At 540, application 104 populates the Relative Version variable with the relative parameter(s) determined at 524.

To illustrate operations 538 and 540, consider the above example in which the command type value is "Line", the absolute parameters are "10 10" and the relative parameters are "1 2". In this case:

Absolute Version (as populated at 538)="L 10 10"
Relative Version (as populated at 540)="1, 2"

Following population of the Absolute Version and Relative Version variables, processing proceeds to 550.

At 550, application 104 compares the Absolute Version and Relative Version strings that have been generated to determine which is smaller. Smaller, in this sense is a measure of the memory required to store the strings (which could, for example, be measured in bytes). In the present example, application 104 determines the size of the Absolute Version and Relative Version by calculating their lengths— e.g. the number of characters they contain. Continuing with example strings generated at 538 and 540:

Length of "L 10 10"=7 characters
Length of "1 2"=3 characters

If, at 550, the length of the Absolute Version string is smaller than (or the same size as) the Relative Version string (e.g. the Absolute Version's length is less than or equal to the length of the Relative Version string), processing proceeds to 552. At 552, application 104 appends the Absolute Version string to the Minified Shape string. The shape command appended to the Minified Shape may be referred to as the compressed version of the selected shape command. Processing then proceeds to 556.

If, at 550, the length of the Relative Version string is smaller than the Absolute Version string (e.g. the Relative Version's length is less than the length of the Absolute Version), processing proceeds to 554. At 554, application 104 appends the Relative Version string to the Minified Shape string. The shape command appended to the Minified Shape may be referred to as the compressed version of the selected shape command. Processing then proceeds to 556.

In alternative implementations, if the length of the Absolute Version string is the same as the length of the Relative Version string, application 104 may instead append the Relative Version string to the Minified Shape string.

At 556, application 104 updates the Current Position variable. As noted, the Current Position variable records an (x, y) coordinate pair as absolute coordinates.

Where the shape command added to the Minified Shape at 552 or 554 is a close path type shape command, application 104 updates the Current Position variable by setting its (x,y) coordinates to the (x,y) coordinates defined by the Last Move variable. This is to account for certain vector graphic specifications (such as the SVG specification) in which a "close path" shape command mandates that the current point (e.g. the "pen") is moved back to the position defined by the previous "move to" shape command.

Where the shape command added to the Minified Shape at 552 or 554 is other than a close path type shape command, application 104 updates the Current Position variable based on the x and/or y coordinates defined by the target of the shape command that was added to the Minified Shape at 552 or 554. If an absolute shape command has been added to the Minified Shape at 552, application 104 updates the x and/or y coordinates of the Current Position variable to record the x and/or y coordinates of that shape command's target (given these are already expressed as absolute coordinates). Conversely, if a relative shape command has been added to the Minified Shape at 554, application 104 updates the Current Position variable as follows:

New current position x=existing current position x+target x of relative shape command (if defined)
New current position y=existing current position y+target y of relative shape command (if defined)

In the described embodiments application 104 performs both the simplification process 300 and minification process 400. In alternative embodiments, these processes may be performed by separate applications (or separate processing modules).

Further, while in certain embodiments both simplification and minification are performed this need not be the case: simplification may be performed without minification and vice versa.

The following sets of numbered clauses describe additional specific embodiments of the disclosure.

Clause Set 1:

Clause 1. A computer implemented method for compressing a shape, the method including:
  receiving input shape data defining one or more shape commands;
  processing a first shape command of the one or more shape commands by:
    determining a type of the first shape command;
    in response to determining the type of the first shape command is a line type shape command:
      determining if the first shape command defines a negligible line; and
      in response to determining that the first shape command does not define a negligible line, recording the first shape command by adding data from the first shape command to a compressed shape.

Clause 2. The computer implemented method of clause 1, wherein determining that the first shape command defines a negligible line is based on a proximity of an end point of a first line defined by the first shape command to a start point of the first line.

Clause 3. The computer implemented method of clause 2, wherein the end point of the first line is defined by the first shape command.

Clause 4. The computer implemented method of clause 2 or clause 3, wherein the start point of the first line is defined by a previously recorded shape command.

Clause 5. The computer implemented method of any one of clauses 2 to 4, wherein determining that the first shape command defines a negligible line includes:
  calculating a horizontal distance between an x coordinate of the end point of the first line and an x coordinate of the start point of the first line;
  calculating a vertical distance between a y coordinate of the end point of the first line and a y coordinate of the start point of the first line; and
  if the horizontal distance is greater than or equal to a horizontal proximity threshold or the vertical distance is greater than or equal to a vertical proximity threshold, determining that the shape command does not define a negligible line.

Clause 6. The computer implemented method of any one of clauses 2 to 4, wherein determining that the first shape command defines a negligible line includes:
  calculating a distance between the start and end points of the first line; and
  if the calculated distance is greater than or equal to a proximity threshold, determining that the shape command does not define a negligible line.

Clause 7. The computer implemented method of any one of clauses 1 to 6, wherein recording the first shape command includes adding the first shape command to the compressed shape.

Clause 8. The computer implemented method of any one of clauses 1 to 6, wherein:
  determining that the first shape command is a line type shape command includes determining that the first shape command is a straight line type shape command; and
  recording the first shape command includes:
    writing data from the first shape command to an open line; and
    adding the open line to the compressed shape.

Clause 9. The computer implemented method of clause 8, wherein prior to adding the open line to the compressed shape, the method further includes processing a second shape command of the one or more shape commands by:
  determining if the second shape command is a straight line type shape command;
  in response to determining that the second shape command is a straight line type shape command, determining whether a first angle defined by the first shape command is within an angular threshold of a second angle defined by the second shape command; and
  in response to determining that the first angle is the same as the second angle, updating the open line to define a line having an end point that is an end point defined by the second shape command.

Clause 10. The computer implemented method of clauses 1 to 6, wherein:
  determining that the first shape command is a line type shape command includes determining that the first shape command is a straight line type shape command; and
  in response to determining that the first shape command does not define a negligible line, the method further includes:
    determining whether a previously recorded shape command is a straight line type shape command;
    in response to determining that the previously recorded shape command is a straight line type shape command, determining whether a first angle defined by the first shape command is within an angular threshold of a second angle defined by the previously recorded shape command; and in response to determining that the first angle is the same as the second angle, recording the first shape command by updating the previously recorded shape command to define a line having an end point that is an end point defined by the first shape command.

Clause 11. The computer implemented method of any one of clauses 1 to 6, wherein:
  determining that the first shape command is a line type shape command includes determining that the first shape command is a curved line type shape command; and
  in response to determining the type of the first shape command is a curved line type shape command the method further includes:
    determining whether the first shape command defines a curve that is substantially flat; and
    in response to determining that the first shape command defines a curve that is not substantially flat, recording the first shape command by adding the first shape command to the compressed shape.

Clause 12. The computer implemented method of clause 11, wherein in response to determining that the first shape command defines a curve that is substantially flat, the method includes:
  converting the first shape command to a new straight line shape command; and
  adding the new straight line shape command to the compressed shape, wherein the new straight line shape command is added to the compressed shape instead of the first shape command.

Clause 13. The computer implemented method of clause 12, wherein converting the first shape command to a new straight line shape command includes generating the new straight line command to define an end point that is the same as an end point defined by the first shape command.

Clause 14. The computer implemented method of any one of clauses 11 to 13, wherein determining whether the first shape command defines a curve that is substantially flat includes:
  calculating a curvature value of the curve defined by the first shape command; and
  determining that the first shape command defines a curve that is substantially flat if the curvature value is less than a defined curvature threshold.

Clause 15. The computer implemented method of any one of clauses 1 to 14, further including processing a third shape command of the one or more shape commands by:
  determining a type of the third shape command; and
  in response to determining that the type of the third shape command is a move type command, recording the third shape command by adding the third shape command to the compressed shape.

Clause 16. The computer implemented method of any one of clauses 1 to 15, further including processing a fourth shape command of the one or more shape commands by:
  determining a type of the fourth shape command; and
  in response to determining that the type of the fourth shape command is a close path type command, recording the fourth shape command by adding the fourth shape command to the compressed shape.

Clause 17. The computer implemented method of any one of clauses 1 to 16, further including:
  determining a maximum number of decimal places; and
  recording the first shape command so that in the compressed shape parameters of the first shape command do not use more than the maximum number of decimal places.

Clause 18. The computer implemented method of clause 17, wherein the maximum number of decimal places is based on one or more of: a number of parameters defined by the input data; a number of shape commands defined by the input data; a number of shape segments defined by the input data.

Clause 19. A computer processing system including:
  a processing unit; an
  a non-transitory computer-readable storage medium storing instructions, which when executed by the processing unit, cause the processing unit to perform a method according to any one of clauses 1 to 18.

Clause 20. A non-transitory storage medium storing instructions executable by processing unit to cause the processing unit to perform a method according to any one of clauses 1 to 18.

Clause Set 2:
  Clause 1. A computer implemented method for generating a compressed shape, the method including:
    receiving input shape data defining a plurality of shape commands, the plurality of shape commands including a first original shape command and an second original shape command;
    generating a first compressed shape command, the first compressed shape command corresponding to the first original shape command;
    adding the first compressed shape command to the compressed shape;
    generating a second compressed shape command, the second compressed shape command corresponding to the second original shape command; and
    adding the second compressed shape command to the compressed shape,
    wherein
      generating the second compressed shape command includes:
        generating a relative version of the second shape command in which one or more parameters defined by the second original shape command are relatively defined;
        generating an absolute version of the second shape command in which one or more parameters defined by the second original shape command are absolutely defined; and
        selecting a smaller or equal smallest of the relative version and the absolute version to be the second compressed shape command.

Clause 2. The computer implemented method of clause 1, wherein:
    the second original shape command defines an original second shape target x coordinate parameter as an absolute x coordinate;
    generating the relative version of the second shape command includes calculating a relative version target x coordinate parameter, the relative version target x coordinate parameter calculated by subtracting a current position x coordinate from the original second shape target x coordinate parameter; and
    generating the absolute version of the second shape command includes setting an absolute version target x coordinate parameter to be equal to the original second shape target x coordinate parameter.

Clause 3. The computer implemented method of clause 1 or clause 2, wherein:
the second original shape command defines an original second shape target y coordinate parameter as an absolute y coordinate;
generating the relative version of the second shape command includes calculating a relative version target y coordinate parameter, the relative version target y coordinate parameter calculated by subtracting a current position y coordinate from the original second shape target y coordinate parameter; and
generating the absolute version of the second shape command includes setting an absolute version target y coordinate parameter to be equal to the original second shape target y coordinate parameter.

Clause 4. The computer implemented method of clause 1, wherein:
the second original shape command defines an original second shape target x coordinate parameter as a relative x coordinate;
generating the relative version of the second shape command includes setting a relative version target x coordinate parameter to be equal to the original second shape target x coordinate parameter; and
generating the absolute version of the second shape command includes calculating an absolute version target x coordinate parameter, the absolute version target x coordinate parameter calculated by adding a current position x coordinate to the original second shape target x coordinate parameter.

Clause 5. The computer implemented method of clause 1, wherein:
the second original shape command defines an original second shape target x coordinate parameter as a relative x coordinate;
generating the relative version of the second shape command includes setting a relative version target x coordinate parameter to be equal to the original second shape target x coordinate parameter; and
generating the absolute version of the second shape command includes calculating an absolute version target x coordinate parameter, the absolute version target x coordinate parameter calculated by adding a current position x coordinate to the original second shape target x coordinate parameter.

Clause 6. The computer implemented method of clause 1 or clause 5, wherein:
the second original shape command defines an original second shape target y coordinate parameter as a relative y coordinate;
generating the relative version of the second shape command includes setting a relative version target y coordinate parameter to be equal to the original second shape target y coordinate parameter; and
generating the absolute version of the second shape command includes calculating an absolute version target y coordinate parameter, the absolute version target y coordinate parameter calculated by adding a current position y coordinate to the original second shape target y coordinate parameter.

Clause 7. The computer implemented method of any one of clauses 1 to 6, wherein selecting the smaller or equal smallest of the relative version and the absolute version to be the compressed version of the second shape command includes:
calculating a length of the relative version;
calculating a length of the absolute version; and
comparing the length of the relative version to the length of the absolute version to determine the smaller or smallest version.

Clause 8. The computer implemented method of clause 7, wherein:
calculating the length of the relative version includes calculating a number of characters in the relative version;
calculating the length of the absolute version includes calculating a number of characters in the absolute version.

Clause 9. The computer implemented method of any one of clauses 1 to 8, wherein generating the second compressed shape command further includes:
determining if a straight line defined by the second original shape command is substantially vertical; and
in response to determining that the straight line defined by the second original shape command is substantially vertical, generating the second compressed shape command to be a straight vertical line shape command, the straight vertical line shape command defining a y coordinate but no x coordinate.

Clause 10. The computer implemented method of clause 9, wherein determining if the straight line defined by the second original shape command is substantially vertical includes determining if a horizontal distance travelled by the straight line defined by the second original shape command is less than a defined horizontal threshold.

Clause 11. The computer implemented method of any one of clauses 1 to 8, wherein generating the second compressed shape command further includes:
determining if a straight line defined by the second original shape command is substantially horizontal; and
in response to determining that the straight line defined by the second original shape command is substantially horizontal, generating the second compressed shape command to be a straight horizontal line shape command, the straight horizontal line shape command defining an x coordinate but no y coordinate.

Clause 12. The computer implemented method of clause 11, wherein determining if the straight line defined by the second original shape command is substantially horizontal includes determining if a vertical distance travelled by the straight line defined by the second original shape command is less than a defined vertical threshold.

Clause 13. The computer implemented method of any one of clauses 1 to 12, wherein
the first original shape command defines a first curve via a first curve first control point, a first curve second control point, and a first curve target point;
the second original shape command defines a second curve via a second curve first control point, a second curve second control point, and a second curve target point; and
generating the second compressed shape command includes:
determining if a join between the first curve and the second curve is a smooth join; and
in response to determining that the join between the first curve and the second curve is a smooth join, generating the second compressed shape command to be a smooth curve type shape command that does not include parameters corresponding to either the second curve first control point or the second curve second control point.

Clause 14. The computer implemented method of any one of clauses 1 to 13, wherein the input shape data is generated according to a method as defined in any one of clause set 1 clauses 1 to 18.

Clause 15. A computer processing system including:
a processing unit; and
a non-transitory computer-readable storage medium storing instructions, which when executed by the processing unit, cause the processing unit to perform a method according to any one of clauses 1 to 14.

Clause 16. A non-transitory storage medium storing instructions executable by processing unit to cause the processing unit to perform a method according to any one of clauses 1 to 14.

Figure 3:
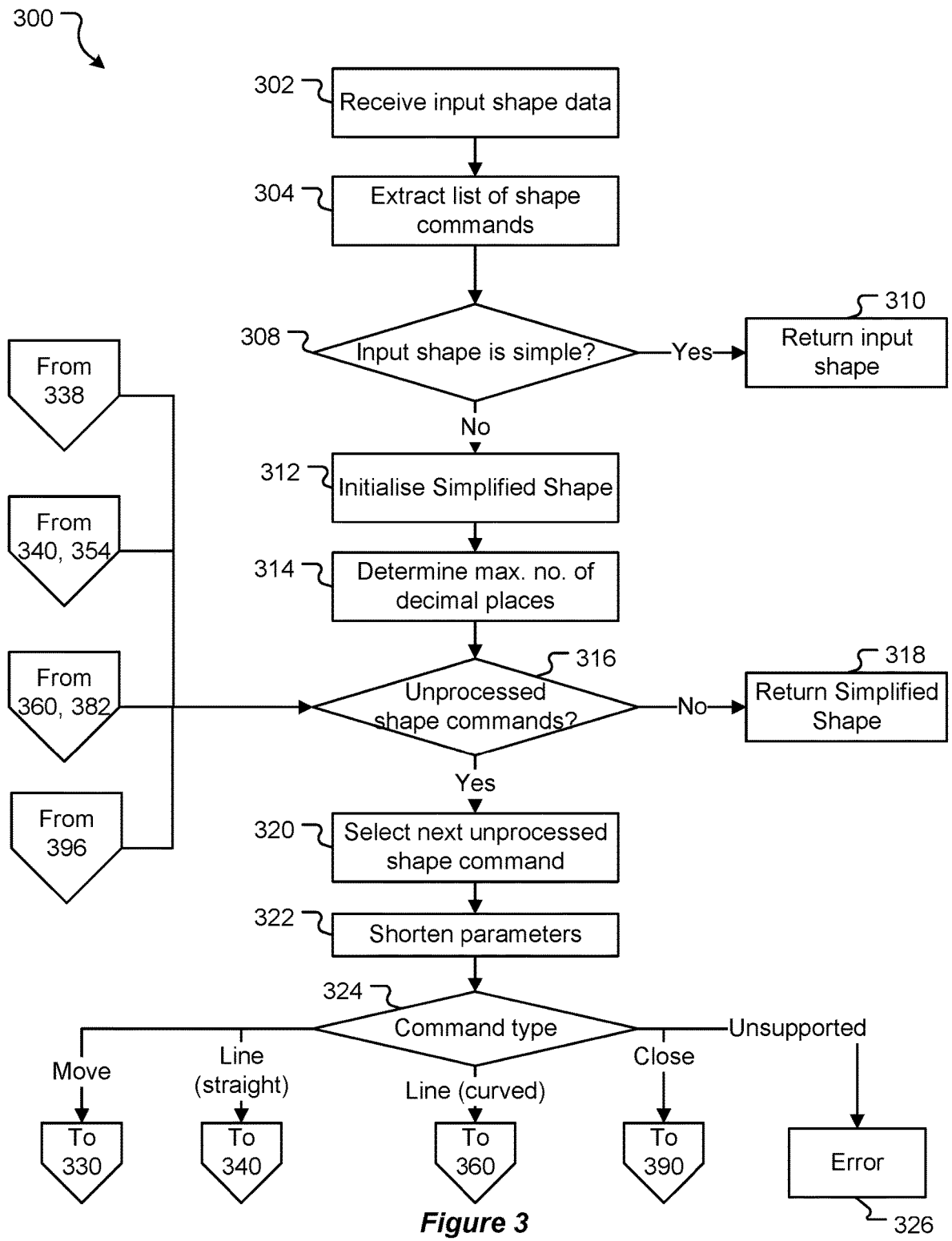
FIG. 3 depicts operations performed in a vector graphic simplification process.
Figure 3:
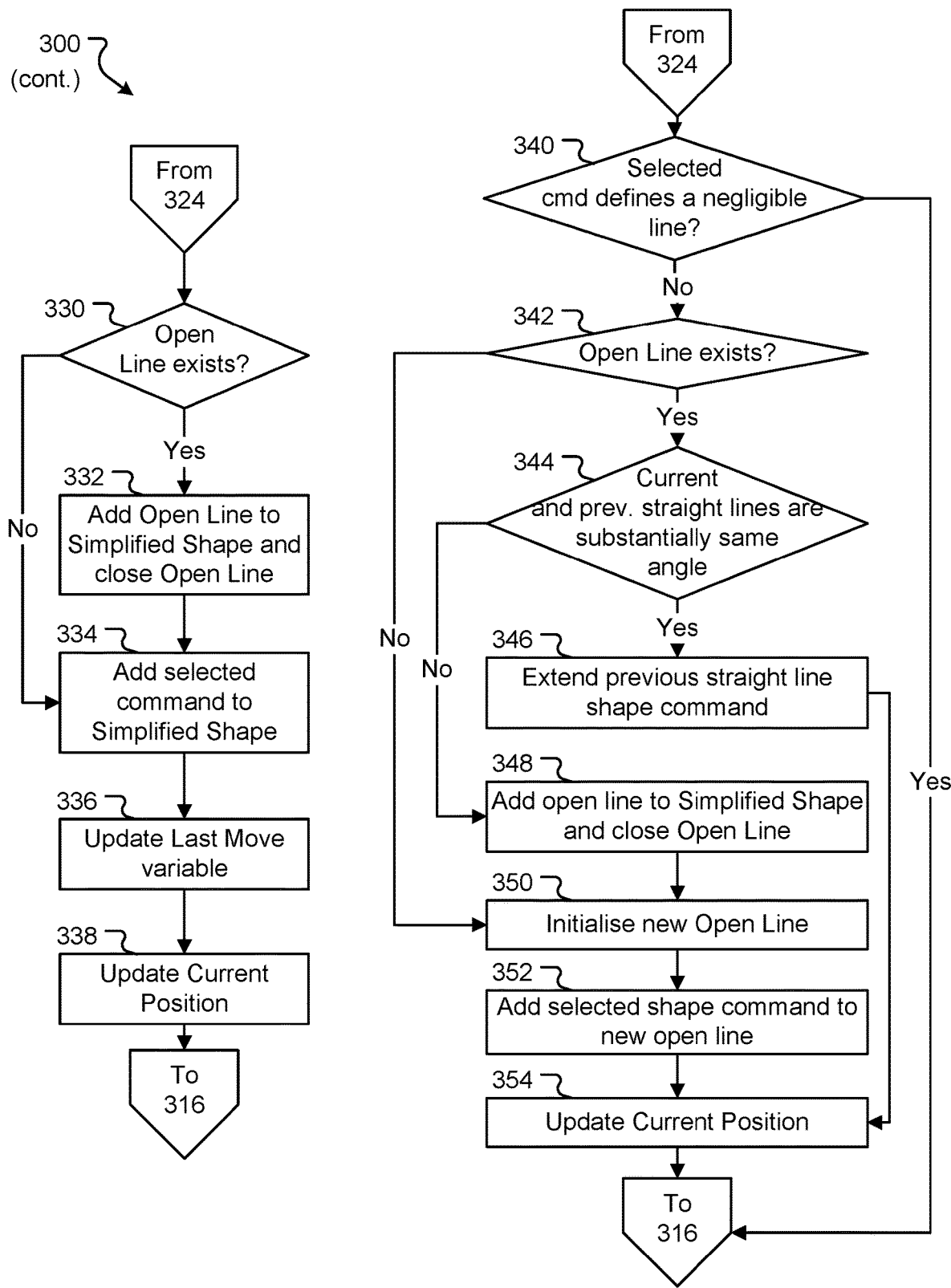
Figure 3:
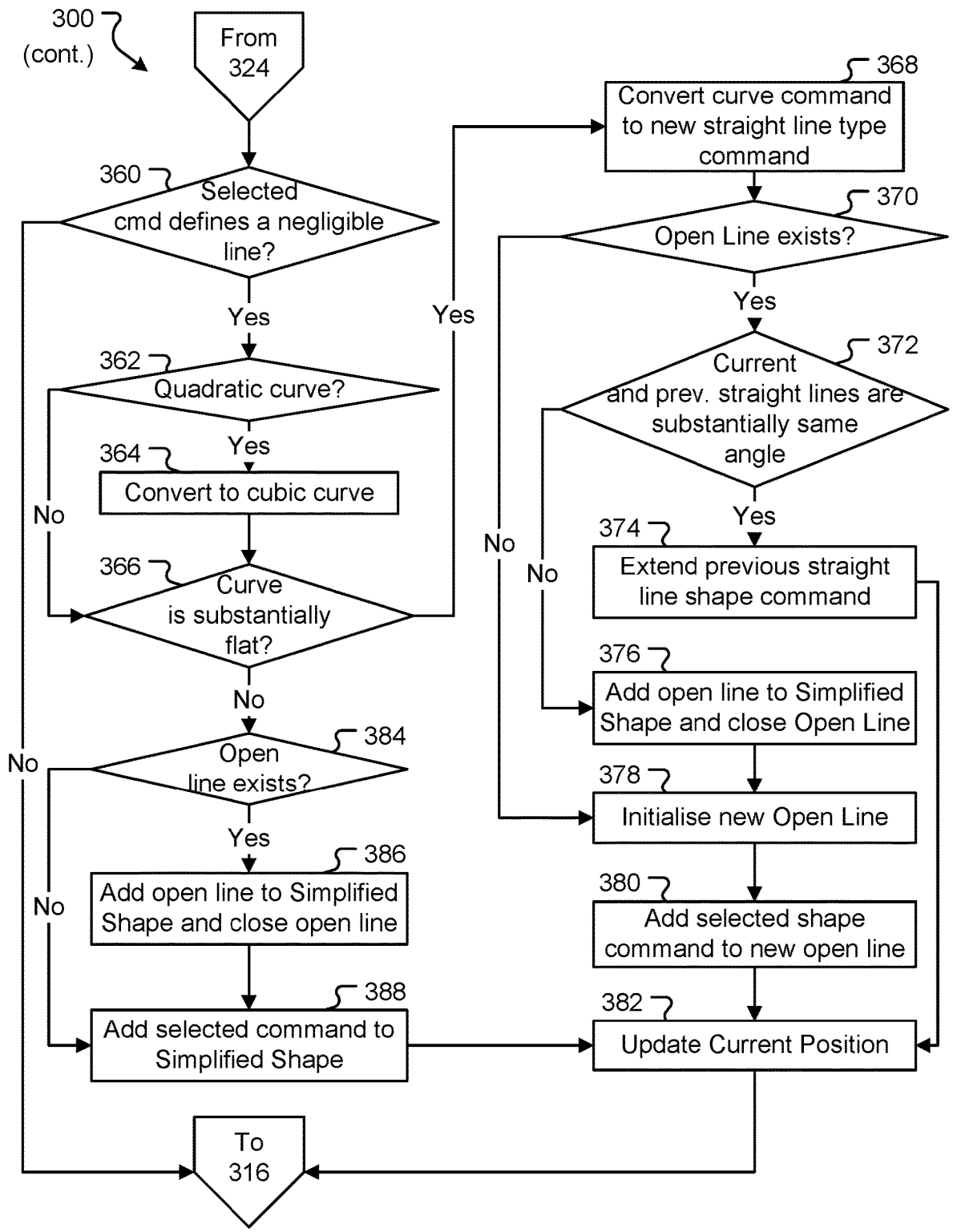
Figure 3:
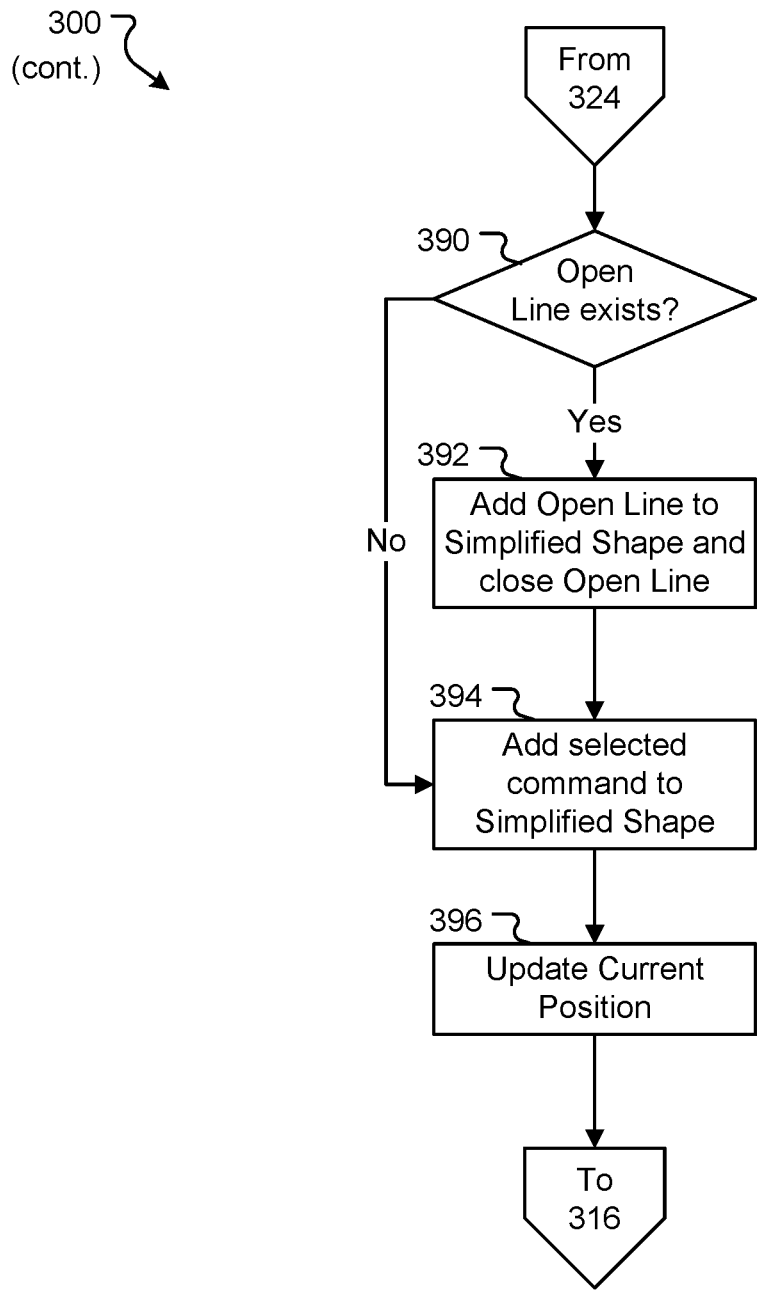

The flowcharts illustrated in FIGS. 3 and 4 and described above define operations in a particular order to illustrate various features of the present disclosure. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, while the operations are described as being performed by application 104 running on computer processing system 102, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required otherwise by context, the terms "first", "second", etc. are used to differentiate between various elements and features and not in an ordinal sense. For example, a first shape command could be termed a second shape command, and, similarly, a second shape command could be termed a first user input, without departing from the scope of the various described examples. By way of further example, in certain cases a second shape command could occur before a first shape command (or without a first shape command existing).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating a compressed shape, the method including:
receiving input shape data defining a first original shape command and a second original shape command;
generating a first compressed shape command corresponding to the first original shape command;
adding the first compressed shape command to the compressed shape;
generating a second compressed shape command corresponding to the second original shape command; and
adding the second compressed shape command to the compressed shape,
wherein generating the second compressed shape command includes:
generating a relative shape command, the relative shape command being a version of the second original shape command in which one or more parameters defined by the second original shape command are relatively defined;
generating an absolute shape command, the absolute shape command being a version of the second original shape command in which the one or more parameters defined by the second original shape command are absolutely defined; and
selecting a smaller or equal smallest of the relative shape command and the absolute shape command to be the second compressed shape command.

2. The computer implemented method of claim 1, wherein the second original shape command defines an absolute target and the method further includes:
calculating a relative target based on the absolute target;
generating the relative shape command to include the relative target; and
generating the absolute shape command to include the absolute target.

3. The computer implemented method of claim 2, wherein the absolute target includes an absolute x coordinate and an absolute y coordinate and calculating the relative target includes at least one of:
calculating a relative x coordinate by subtracting a current x coordinate from the absolute x coordinate; and
calculating a relative y coordinate by subtracting a current y coordinate from the absolute y coordinate.

4. The computer implemented method of claim 1, wherein the second original shape command defines a relative target and the method further includes:
calculating an absolute target based on the relative target;
generating the relative shape command to include the relative target; and
generating the absolute shape command to include the absolute target.

5. The computer implemented method of claim 4, wherein the relative target includes a relative x coordinate and a relative y coordinate and calculating the absolute target includes at least one of:
calculating an absolute x coordinate by adding a current x coordinate to the relative x coordinate; and
calculating an absolute y coordinate by adding a current y coordinate to the relative y coordinate.

6. The computer implemented method of claim 1, wherein selecting the smaller or equal smallest of the relative shape command and the absolute shape command includes:
calculating a length of the relative shape command;
calculating a length of the absolute shape command; and
comparing the length of the relative shape command to the length of the absolute shape command.

7. The computer implemented method of claim 6, wherein:
calculating the length of the relative shape command includes calculating a number of characters in the relative shape command; and calculating the length of the absolute shape command includes calculating a number of characters in the absolute shape command.

8. The computer implemented method claim 1, wherein generating the second compressed shape command further includes:
   determining if a straight line defined by the second original shape command is substantially vertical; and
   in response to determining that the straight line defined by the second original shape command is substantially vertical, generating the second compressed shape command to be a vertical line shape command, the vertical line shape command defining a y coordinate but no x coordinate.

9. The computer implemented method of claim 1, wherein generating the second compressed shape command further comprises:
   determining if a straight line defined by the second original shape command is substantially horizontal; and
   in response to determining that the straight line defined by the second original shape command is substantially horizontal, generating the second compressed shape command to be a horizontal line shape command, the horizontal line shape command defining an x coordinate but no y coordinate.

10. The computer implemented method of claim 1, wherein
   the first original shape command defines a first curve via a first control point, a second control point, and a first curve target point;
   the second original shape command defines a second curve via a third control point, a fourth control point, and a second curve target point; and
   generating the second compressed shape command includes:
      determining if a join between the first curve and the second curve is a smooth join; and
      in response to determining that the join between the first curve and the second curve is a smooth join, generating the second compressed shape command to be a smooth curve type shape command that does not include parameters corresponding to the third control point or the fourth control point.

11. The computer implemented method of claim 1, further including generating the input shape data by processing an initial set of shape commands, and wherein processing the initial set of shape commands includes processing a first initial shape command by:
   determining if a first initial shape command defines a negligible line; and
   in response to determining that the first initial shape command does not define a negligible line, including the first initial shape command in the input shape data.

12. A computer processing system including:
   a processing unit; and
   a non-transitory computer-readable storage medium storing instructions, which when executed by the processing unit, cause the processing unit to perform a method for generating a compressed shape, the method including:
      receiving input shape data defining a first original shape command and a second original shape command;
      generating, by the processing unit, a first compressed shape command corresponding to the first original shape command;
      adding the first compressed shape command to the compressed shape;
      generating a second compressed shape command corresponding to the second original shape command; and
      adding the second compressed shape command to the compressed shape,
      wherein generating the second compressed shape command includes:
         generating a relative shape command, the relative shape command being a version of the second original shape command in which one or more parameters defined by the second original shape command are relatively defined;
         generating an absolute shape command, the absolute shape command being a version of the second original shape command in which the one or more parameters defined by the second original shape command are absolutely defined; and
         selecting a smaller or equal smallest of the relative shape command and the absolute shape command to be the second compressed shape command.

13. The computer processing system of claim 12, wherein the second original shape command defines an absolute target and the method further includes:
   calculating a relative target based on the absolute target;
   generating the relative shape command to include the relative target; and
   generating the absolute shape command to include the absolute target.

14. The computer processing system of claim 13, wherein the absolute target includes an absolute x coordinate and an absolute y coordinate and calculating the relative target includes at least one of:
   calculating a relative x coordinate by subtracting a current x coordinate from the absolute x coordinate; and
   calculating a relative y coordinate by subtracting a current y coordinate from the absolute y coordinate.

15. The computer processing system of claim 12, wherein the second original shape command defines a relative target and the method further includes:
   calculating an absolute target based on the relative target;
   generating the relative shape command to include the relative target; and
   generating the absolute shape command to include the absolute target.

16. The computer processing system of claim 15, wherein the relative target includes a relative x coordinate and a relative y coordinate and calculating the absolute target includes at least one of:
   calculating an absolute x coordinate by adding a current x coordinate to the relative x coordinate; and
   calculating an absolute y coordinate by adding a current y coordinate to the relative y coordinate.

17. The computer processing system claim 12, wherein generating the second compressed shape command further includes:
   determining if a straight line defined by the second original shape command is substantially vertical; and
   in response to determining that the straight line defined by the second original shape command is substantially vertical, generating the second compressed shape command to be a vertical line shape command, the vertical line shape command defining a y coordinate but no x coordinate.

18. The computer processing system of claim 12, wherein generating the second compressed shape command further comprises:
- determining if a straight line defined by the second original shape command is substantially horizontal; and
- in response to determining that the straight line defined by the second original shape command is substantially horizontal, generating the second compressed shape command to be a horizontal line shape command, the horizontal line shape command defining an x coordinate but no y coordinate.

19. The computer processing system of claim 12, wherein
- the first original shape command defines a first curve via a first control point, a second control point, and a first curve target point;
- the second original shape command defines a second curve via a third control point, a fourth control point, and a second curve target point; and
- generating the second compressed shape command includes:
  - determining whether a join between the first curve and the second curve is a smooth join; and
  - in response to determining that the join between the first curve and the second curve is a smooth join, generating the second compressed shape command to be a smooth curve type shape command that does not include parameters corresponding to the third control point or the fourth control point.

20. A non-transitory storage medium storing instructions executable by processing unit to cause the processing unit to perform a method for generating a compressed shape, the method including:
- receiving input shape data defining a first original shape command and a second original shape command;
- generating a first compressed shape command corresponding to the first original shape command;
- adding the first compressed shape command to the compressed shape;
- generating a second compressed shape command corresponding to the second original shape command; and
- adding the second compressed shape command to the compressed shape,
- wherein generating the second compressed shape command includes:
  - generating a relative shape command, the relative shape command being a version of the second original shape command in which one or more parameters defined by the second original shape command are relatively defined;
  - generating an absolute shape command, the absolute shape command being a version of the second original shape command in which the one or more parameters defined by the second original shape command are absolutely defined; and
  - selecting a smaller or equal smallest of the relative shape command and the absolute shape command to be the second compressed shape command.

* * * * *